United States Patent
Motomura et al.

(10) Patent No.: US 6,754,680 B1
(45) Date of Patent: Jun. 22, 2004

(54) DATA CONTROL EQUIPMENT, METHOD TO CONTROL DATA AND RECORDING MEDIUM TO RECORD DATA CONTROL PROCEDURE

(75) Inventors: Naohisa Motomura, Hiroshima-ken (JP); Masako Ninomiya, Hiroshima-ken (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/572,871

(22) Filed: May 18, 2000

(30) Foreign Application Priority Data

May 20, 1999 (JP) .......................................... 11-140364

(51) Int. Cl.$^7$ .............................................. G06F 17/30
(52) U.S. Cl. ...................... 707/202; 707/205; 711/161; 711/162
(58) Field of Search ................................ 707/205, 202; 369/53.17, 53.4, 48, 58; 360/62, 72.2; 711/161, 162

(56) References Cited

U.S. PATENT DOCUMENTS

| | | | | |
|---|---|---|---|---|
| 4,733,349 A | * | 3/1988 | Sumiyoshi et al. | 711/114 |
| 4,986,668 A | * | 1/1991 | Fukushima et al. | 360/49 |
| 5,111,444 A | * | 5/1992 | Fukushima et al. | 369/30.07 |
| 5,214,781 A | * | 5/1993 | Miki et al. | 369/59.25 |
| 5,434,991 A | * | 7/1995 | Maeda et al. | 369/30.04 |
| 5,442,611 A | * | 8/1995 | Hosaka | 369/47.23 |
| 5,442,614 A | * | 8/1995 | Tamegai | 235/456 |
| 5,485,439 A | * | 1/1996 | Hamasaka et al. | 369/47.36 |
| 5,603,020 A | * | 2/1997 | Hashimoto et al. | 707/200 |
| 5,684,986 A | * | 11/1997 | Moertl et al. | 707/101 |
| 5,831,966 A | * | 11/1998 | Taira et al. | 369/275.3 |
| 5,862,083 A | * | 1/1999 | Tobita et al. | 365/185.09 |
| 5,875,459 A | * | 2/1999 | Taoda | 711/114 |
| 6,122,646 A | * | 9/2000 | Igarashi et al. | 707/205 |
| 6,160,778 A | * | 12/2000 | Ito et al. | 369/275.3 |
| 6,185,665 B1 | * | 2/2001 | Owada et al. | 707/205 |
| 6,314,542 B1 | * | 11/2001 | Nagai et al. | 714/755 |
| 6,421,687 B1 | * | 7/2002 | Klostermann | 707/202 |

FOREIGN PATENT DOCUMENTS

JP           10-275058           10/1998

\* cited by examiner

*Primary Examiner*—Jean R. Homere
*Assistant Examiner*—Leslie Wong
(74) *Attorney, Agent, or Firm*—McDermott, Will & Emery

(57) ABSTRACT

A data management apparatus for high-speed, seamless recording and reproduction of data, equipped with a recovery function and a defective region detection function, a data management function, and a recording medium. The data management apparatus records blocks of a fixed size on a first recording medium after dividing a stream data in blocks of a fixed size and manages the stream data recorded on the first recording medium based on the file management information to specify the stream data. After generating retrieval information on the blocks of a fixed size, the retrieval information is recorded in the blocks of a fixed size. File management information based on the retrieval information when the recovery of the file management information is requested. The retrieval information is recorded on a remaining region of the last sector where the data block is recorded.

18 Claims, 27 Drawing Sheets

An arrangement example of file management information items

File management structural body

An arrangement example of retrieval information items

231: Retrieval information structural body

An arrangement example of split storage information

241: Split storage information structural body

An arrangement example of access history information items

Access time history information

An arrangement example of defective region information items

261:Defective block structural body

DATA CONTROL EQUIPMENT, METHOD TO CONTROL DATA AND RECORDING MEDIUM TO RECORD DATA CONTROL PROCEDURE

BACKGROUND OF THE INVENTION

1. Field of the Invention

The present invention relates to management of data recorded in recording media. More specifically, the present invention relates to a data management apparatus for recording and reproducing time-wise continuous data and its data management method.

2. Description of the Prior Art

Data should be recorded and reproduced seamlessly at a high speed in systems like a video server system and nonlinear editing system where time-wise continuous analog signals like images, voices and sounds are digitized and where stream-oriented data is recorded to and reproduced from a recording medium like a hard disk. To meet these requirements, various data management apparatuses have been proposed.

Shown in FIG. 29 is a block diagram of a data management apparatus disclosed in the Japanese patent application laid open under No.10-275058. A computer 8 that makes up this data management apparatus includes a CPU 9, an I/O adapter 10, a memory 5, a PCI bus 1 as host bus, SCSI adapters 2(k) as host adapters connected to the PCI bus 1 (in the present specification, k represents a natural number of one to four), hard disks 4(k) as recording medium connected to SCSI buses 3(k) of those SCSI adapters 2(k), and a control unit 11 that controls access to the hard disks 4(k).

Four SCSI adapters 2(1) to 2(4) paired with four hard disk 4(1) to 4(4) respectively form a group of four recording units. That is, of the four adapters and four hard disks, each pair having the same number in the parentheses form one unit.

Each SCSI adapter 2(k) permits bus master DMA transfer. In other words, a controller 6 built in the SCSI adapter 2(k) acquires occupancy right of the PCI bus 1, and can transfer any data on the memory 5 to a buffer 7 built in the SCSI adapter 2(k).

In the above arrangement, the host bus used is a PCI bus. Any other kind of data transfer bus may be used instead as long as the transfer speed requirements are met. SCSI adapters are used as host adapters. As their alternative, host adapters of any other kind may do as long as they permit bus master DMA transfer.

The I/O adapter 10 can input in the memory 5 a high bit rate stream data in fixed size blocks, and transfer the same to a specific area in the memory 5 or output data—that is already recorded in a specific area in the memory 5—as a stream data according to instructions from the control unit 11.

The control unit 11 comprises a recording control means 111, a file management means 112 and reproduction control means 113 that are each constituted of software working under CPU. In another arrangement, the data required for control, especially file management information managed by the recording control means 111, is stored in recording means, a hard disk, for example, other than the above-mentioned hard disk 4(k).

In other words, the recording control means 111 under the control of CPU 9 allocates and records among the respective hard disks 4 a stream data continuously inputted in the memory 5 in fixed size blocks so that the data are recorded in time without fail (that is, no overflow in memory 5 is ensured). The file management means 112 arranges and manages the data recorded on the respective hard disks 4. The reproduction control means 113 controls the data so that the data allocated in the respective hard disks 4 is read out and rebuilt one after another into a stream data and outputted to the I/O adapter 10.

Detailed procedure of recording data by the recording control means 111 is explained.

Inputting means (not shown) included in the recording control means 111 divides a stream data inputted from I/O adapter 10 in blocks $\hat{1}, \hat{2}, \hat{3} \ldots$ of a fixed size and allocates the above data divided in blocks $\hat{1}, \hat{2}, \hat{3} \ldots$ of a fixed size to the respective hard disks 4(k) by relating the data thereto so that a plurality of hard disks 4(k) forming the above described recording unit group makes one logical recording space.

At the same time, writing means (not shown) included in the recording control means 111 directs the respective SCSI adapters 2(k) to transfer the above allocated blocks $\hat{1}, \hat{2}, \hat{3} \ldots$ of a fixed size to the respective hard disks 4(k). So directed, controllers 6 (k) built in the SCSI adapters 2(k) store the above blocks $\hat{1}, \hat{2}, \hat{3} \ldots$ of a fixed size in the buffers 7(k) and record data on the hard disks 4(k) respectively.

To illustrate, as shown in FIG. 30, the controller 6(1) records the fixed-size block $\hat{1}$ on the hard disk 4(1). The controller 6(2) records the block $\hat{2}$ of a fixed size on the hard disk 4(2). And the controller 6(3) records the block $\hat{3}$ of a fixed size on the hard disk 4(3). This way, the above blocks $\hat{1}, \hat{2}, \hat{3} \ldots$ of a fixed size are recorded in sequential order.

The above process alternates between the step of transferring data to a buffer 7(k) forming a recording unit from the stream data source and the step of recording the data from the buffer 7(k) to a hard disk 4(k). In a plurality of recording units, the above-described steps are apparently performed simultaneously, permitting high-speed and seamless recording of data.

The file management means 112 manages a variety of pieces of information about the stream data recorded on the hard disk 4(k) above as file management information. (Details of the file management information will be explained later.)

In case files are managed by a computer etc. in a usual manner, the file system, for example, a file allocation table (FAT), provided in the operating system used in the computer is employed. Therefore, such functions as a function of recovering broken data on the hard disk ("recovering function"), and a function of detecting defective regions on the hard disk ("defective region detecting function") are performed by using the above-mentioned file system.

Naturally, however, it is necessary to independently design the recovering function or the defective regions detecting function in a management apparatus provided with an independent file system as described above and not with the file system adopted in the operating system.

In the file systems such as FAT, data to be recorded and file management information are stored on the same recording medium but in different regions. As a result the head has to seek frequently on the hard disk. However, since recording and reproduction of a stream data like video data has to be carried out seamlessly at a high speed the seeking of the head on the hard disk has to be minimized.

In consideration of that, it is necessary to develop a file system that records file management information on a recording medium independent from the data to be recorded. Furthermore, the file system must posses functions of recovering data and detecting defective regions.

In other words, when file management information stored in the aforesaid other recording medium is damaged due to some circumstances, the information can not be recorded or reproduced even though the stream data itself exists on the hard disk 4. In such a case, the file management information stored on the above-mentioned data recording medium has to be repaired. In addition, in case on-going data recording is interrupted because of some trouble, a variety of pieces of information on the stream data recorded up to the point of the interruption is not normally registered as file management information on the above-mentioned other recording medium. Then, to avoid the stream data becoming invalid, it is necessary to generate file management information on the above-mentioned other recording medium.

Furthermore, in case a defective sector exists during data recording, the head on the hard disk 4 attempts to write several times (number of trials varies depending on the system). When writing fails after several trials, recording is done on a substitute sector. The substitute sector is located away from the original sector, and the head has to seek. The seeking to the substitute sector increases as the number of defective sectors rises, which greatly affects the access efficiency of the hard disk 4 and becomes the cause of errors (overflow errors and underflow errors) in recording and reproducing a stream data. This problem is the time needed for recording and reproducing is prolonged while the recording and reproduction instructions to the hard disk 4 themselves do not become errors. It is a difficult problem to deal with.

SUMMARY OF THE INVENTION

In view of the prior art described above, including the disadvantages and deficiencies of the prior art, it is an object of the present invention to provide a data management apparatus for high-speed and seam-less recording and reproduction of data, which is provided with a function of recovering data and a function of detecting defective regions; its data management method; and furthermore, a recording medium where the procedure to materialize the method is recorded.

To achieve the foregoing object, the following means are adopted. That is, the present invention is built on a data management apparatus provided, as shown in FIG. 1, with a recording control means 111 which divides a stream data into blocks of a fixed size and records these fixed-size data blocks on first recording media 4 and a file management means 112 which manages the data stream—recorded on the first recording media—according to file management information to specify the stream data.

Here, after generating retrieval information on the fixed size blocks, the recording control means 111 adds and records the retrieval information to the fixed size blocks, while a recovering means 114 recovers file management information on the basis of the above-mentioned retrieval information when instructed to do so.

If the above-mentioned retrieval information is recorded on the remaining area of the last sector of a block, there is no need to provide a special sector, and recovery is possible to make with a small volume. The recording of the above-mentioned retrieval information does not always have to be effected on the remaining area but may be made on the sector next to the last sector of the block, though.

Furthermore, the recording control means 111 splits file management information into units of a specific size, generating a plurality of pieces of split management information. And the recording control means 11 adds and records the split management information on the above-mentioned blocks of a fixed size. The recovering means 114 recovers file management information on the basis of the above-mentioned split management information when instructed to do so.

In the above-mentioned procedure, it is desirable to record file management information on a recording medium other than the first recording medium in order to maintain the high speed of recording and reproduction. This second recording medium may be a hard disk, flash memory and so forth. Here, it is so arranged that the file management information recorded on the second recording medium is split into units of a fixed size to generate a plurality of pieces of split management information. Then, the split management information is added to the fixed size blocks and recorded on the first recording medium.

Furthermore, the recording control means 111 generates access history information about accessing of fixed-size blocks, for example, writing time history. After that, the recording control means 111 adds and records the access history information to the fixed size blocks. Defective region detection means 115 shown in FIG. 2 detects a defective region on the recording medium 4—a region where the access history information exceeds a specific value. The reproduction control means 113 generates history information about the reproduction time of fixed size blocks and then adds and records history information about the reproduction time (reading time) to the above-mentioned fixed size blocks. And a region where the history information on the reproduction time exceeds a specific value is detected.

The number of detective sectors within the fixed size blocks may be used as an alternative to the above-mentioned writing time history, reading time history. It may also be so arranged that instead of judging fixed size blocks as flawless or defective on a specific threshold level as set forth above, a plurality of levels generated according to the value of the access history in the above-mentioned defective sector detection procedure are prepared in advance. And a choice is made from among those levels according to an application used.

DESCRIPTION OF THE PREFERRED EMBODIMENTS

Now, the embodiments of the present invention are described with reference to the drawings.

Embodiment 1

Figure 1:
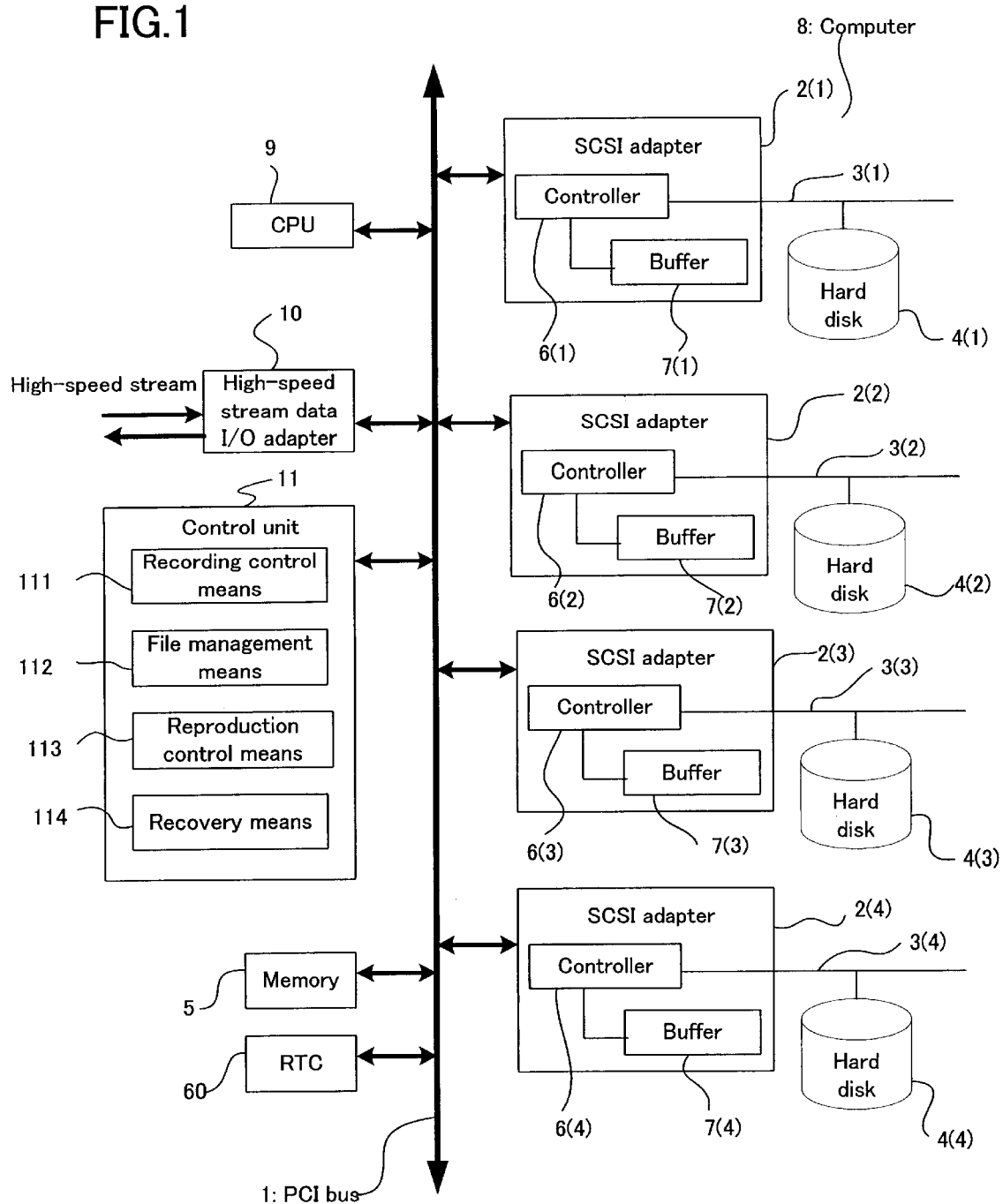
FIG. 1 is a schematic functional block diagram of the data management apparatus of a first embodiment.
Figure 2:
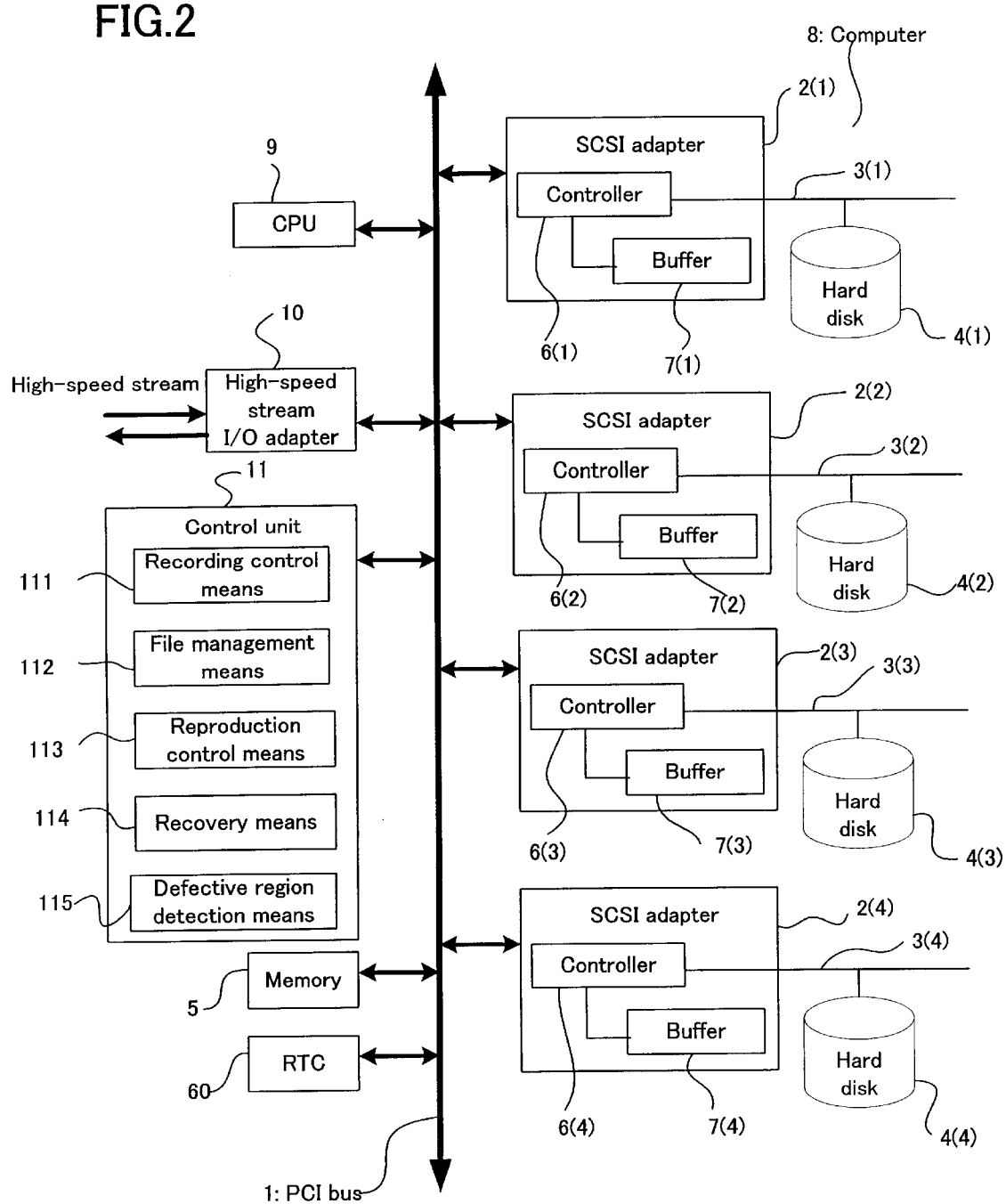
FIG. 2 is a schematic functional block diagram of the data management apparatus of a second embodiment.

FIG. 1 is a schematic functional block diagram of a computer to which the present invention is applied. The configuration is explained with description limited to the points in which the present invention is different from the prior art.

(Recording Format)

FIG. 3(a) shows a recording format on the hard disk 4 as a first recording means. Between one fixed size block and the next one are added and recorded (stored) a variety of pieces of information that produce the effects of the present invention.

In other words, the foremost sector (latest stream information storing sector 200) of each hard disk 4(k) stores a stream of information—which will be described later—each time a stream data is recorded. It is understood that the video data showing a series of chronologically continuous scenes is called a stream data, and that one file is formed of at least one stream data.

It is also noted that the remaining area (retrieval information storing sector 201) of the last of the sectors on which a block of a fixed size is recorded stores retrieval information which will be described later. If this retrieval information is too large for the remaining area of the last sector, the next sector may be used as retrieval information storing sector 201.

Furthermore, the sector (split management information storing sector 202) after the retrieval information storing sector 201 stores split management information. The sector (writing time history information storage sector 203) after the split management information storing sector 202 stores writing time history information which will be described later. The sector (reading time history information storage sector 204) after that stores reading time history information which will also be described later.

Figure 3:
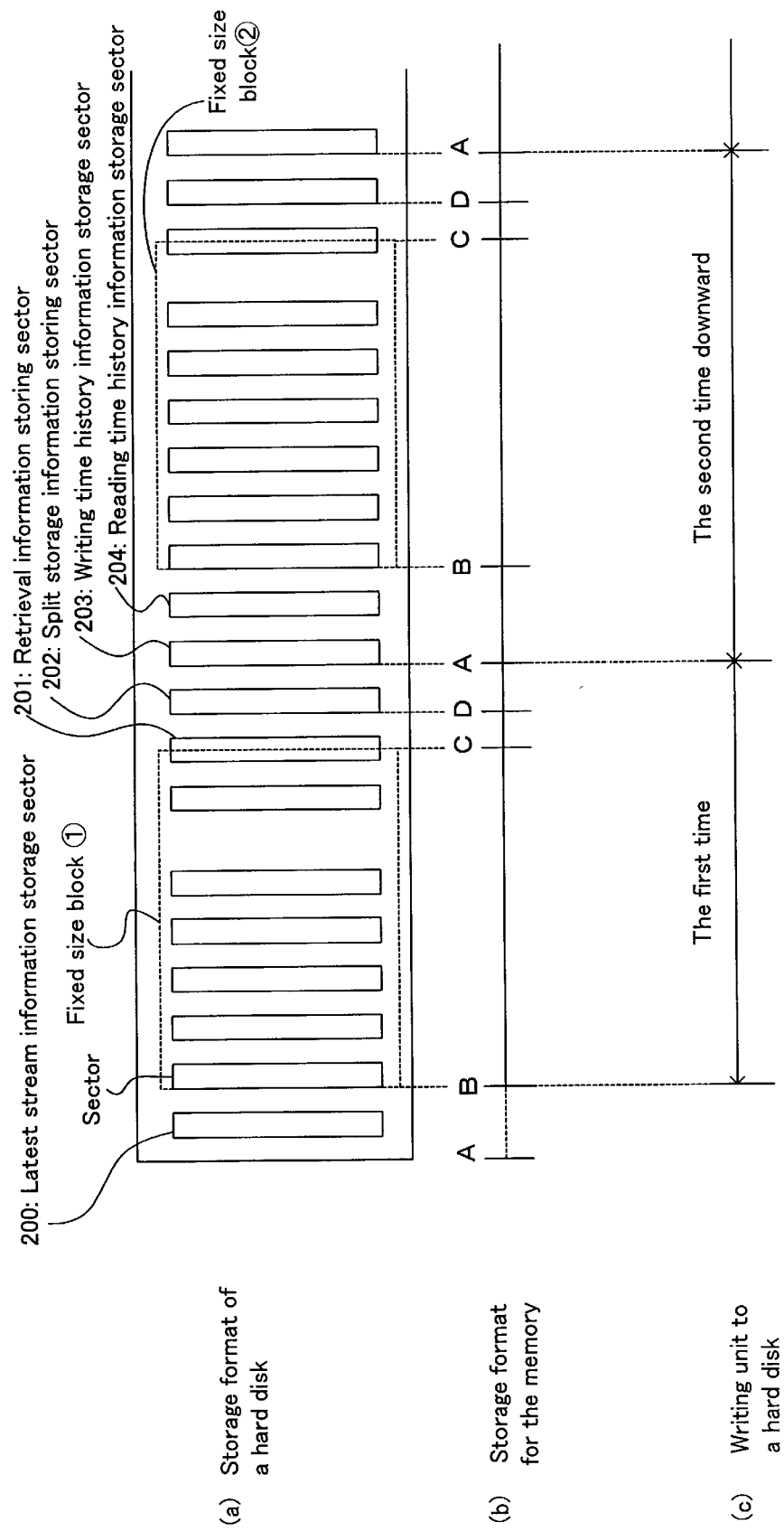
FIG. 3 is a diagrammatic illustration of a recording format.

Pieces of information stored in the writing time history information storage sector 203 and the reading time history information storage sector 204 as shown in FIG. 3 are all information about the writing and reading time histories of the fixed size block.

(Recording Process)

First, the procedure of recording a stream data on the hard disk 4 is explained.

Looking at the screen showing a dialog box for inputting information in the I/O adapter 10, the user clicks a mouse, for example, to issue recording instructions. And to record a stream data on the hard disk 4, the inputting means and the writing means included in the recording control means 111 under the control of CPU 9 are started up.

Figure 4:
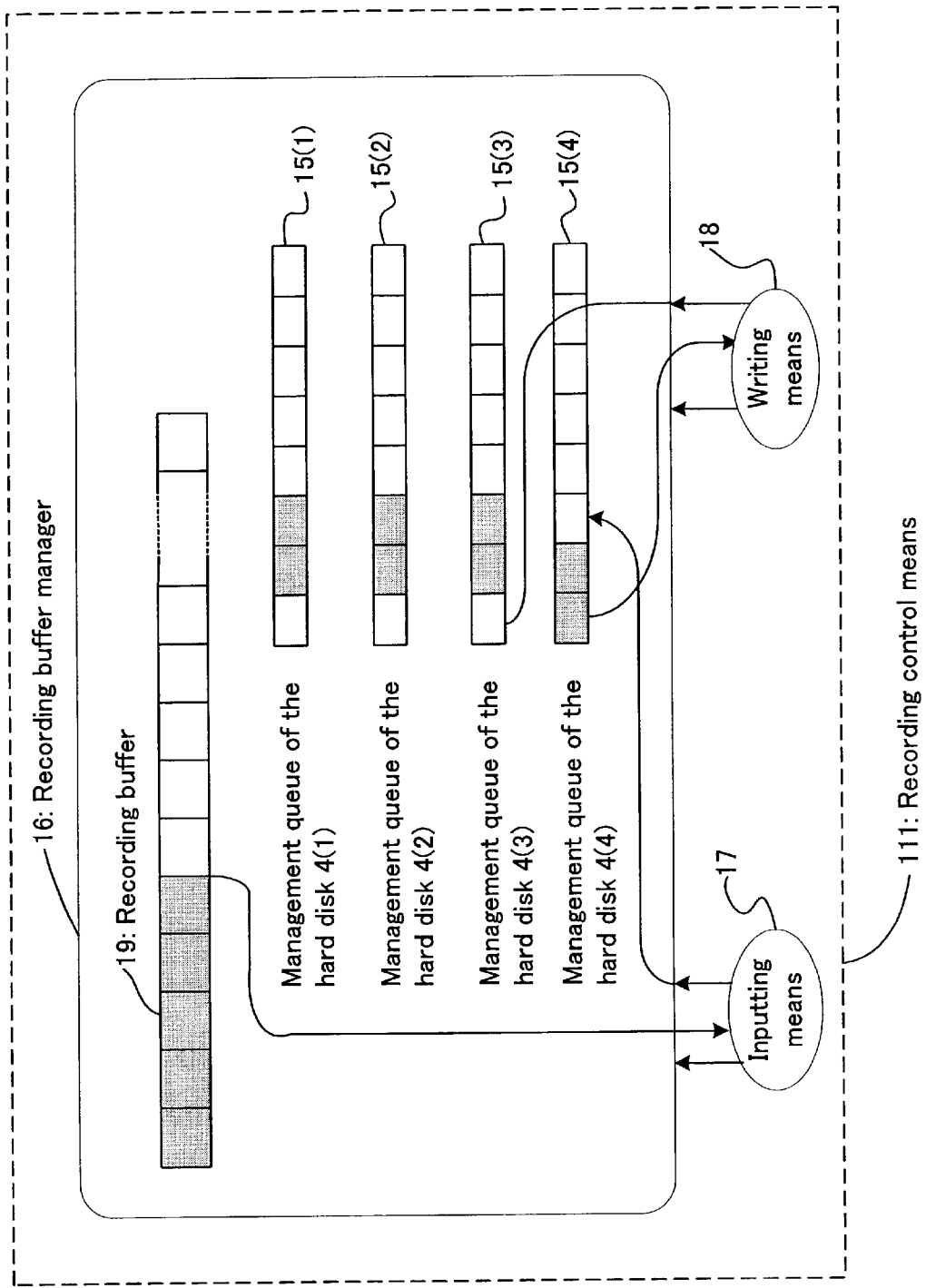
FIG. 4 is a diagrammatic illustration of a recording control means.

Illustratively, the recording control means 111 comprises an inputting means 17, a writing means 18 and a recording buffer manager 16 as shown in FIG. 4. The recording buffer manager 16 manages a recording buffer 14 that stores a stream data in blocks of a fixed size and recording management queues 15(k) (corresponding to the respective hard disks 4(k)) that hold the addresses of the areas in the recording buffer 14 where fixed size blocks are stored. In this connection, the recording buffer 14 and the recording management queues 15(k) are both formed in the memory 5.

Figure 13:
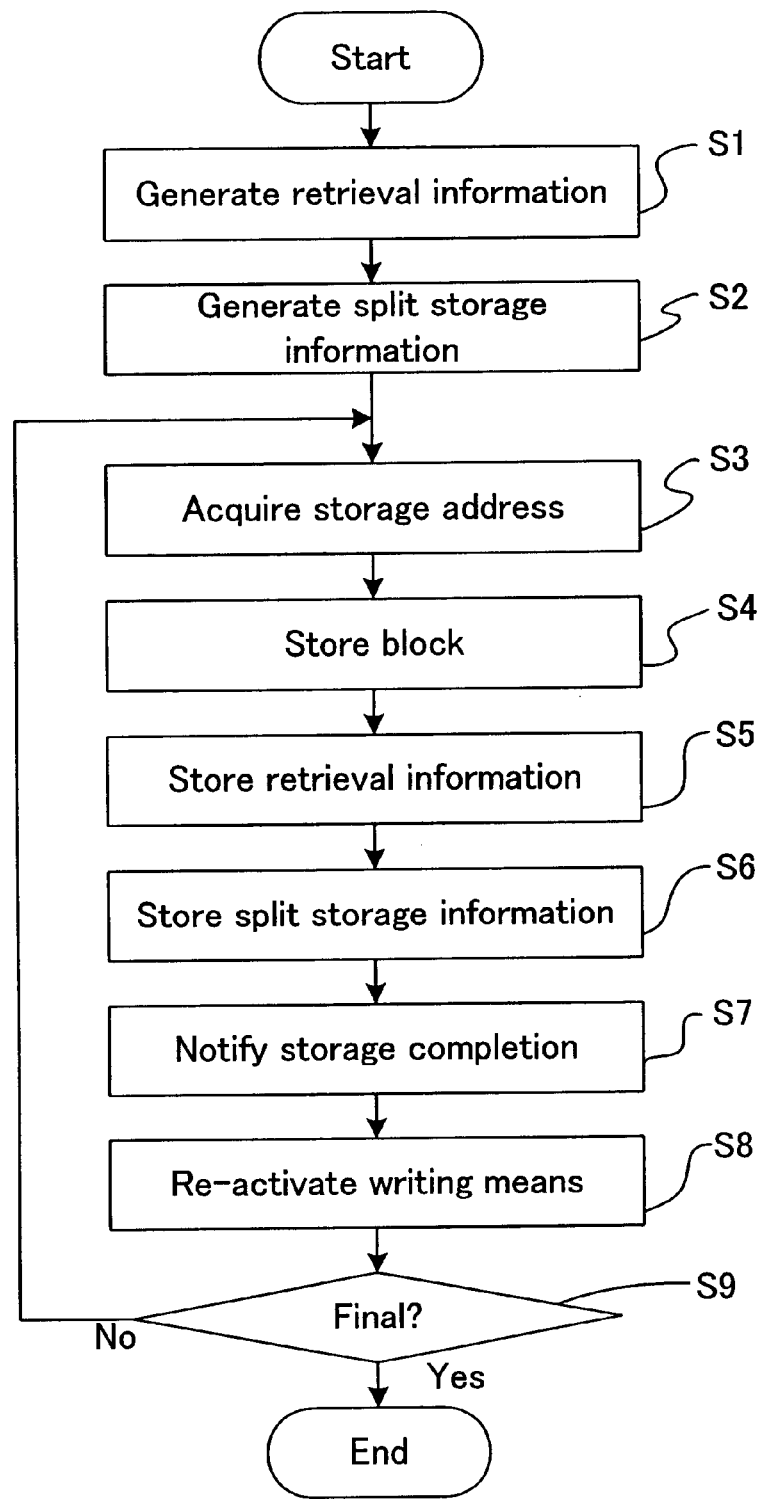
FIG. 13 is a flow chart showing the inputting process in the first embodiment.

FIG. 13 is a flow chart illustrating the process (inputting) performed by the started up inputting means 17.

Figure 7:
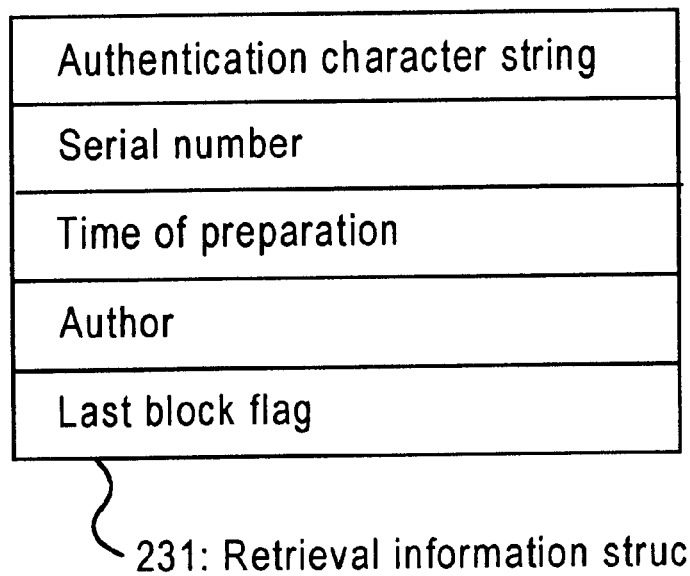
FIG. 7 is an arrangement example of retrieval information items.

First, the inputting means 17 generates retrieval information in the memory 5 (FIG. 13, Step S 1). The "retrieval information" used here, means a variety of pieces of information on the fixed size block (hereinafter referred to as "block") that are generated for each of the blocks forming a stream data. According to the present invention, a retrieval information structural body 231 as shown in FIG. 7 is generated in the memory 5, and then the following information is set in this retrieval information structural body 231 to generate retrieval information.

That is, an authentication character string (retrieval information authentication character string) indicating that the information is retrieval information is set in the "authentication character string" field. And serial numbers given to blocks of a stream data—to be recorded—from the top block to the last block in that order are set in the "serial number" field. Furthermore, the present time, or the time at the present moment acquired from a clock element (RTC 60 shown in FIG. 1) that keeps the present time is set in the "the present time area." Author information acquired from the file management means 112 is set in the "author" field. In addition, information (flag) indicating to the effect that the block is the last block is set in the "last block flag" field.

In this connection, the present time (corresponding to the starting time of the current recording) set in the "preparation time" field and the author information (information on the user who directed the recording) set in the "author" field remain the same throughout a stream data from the top block to the last block.

Figure 8:
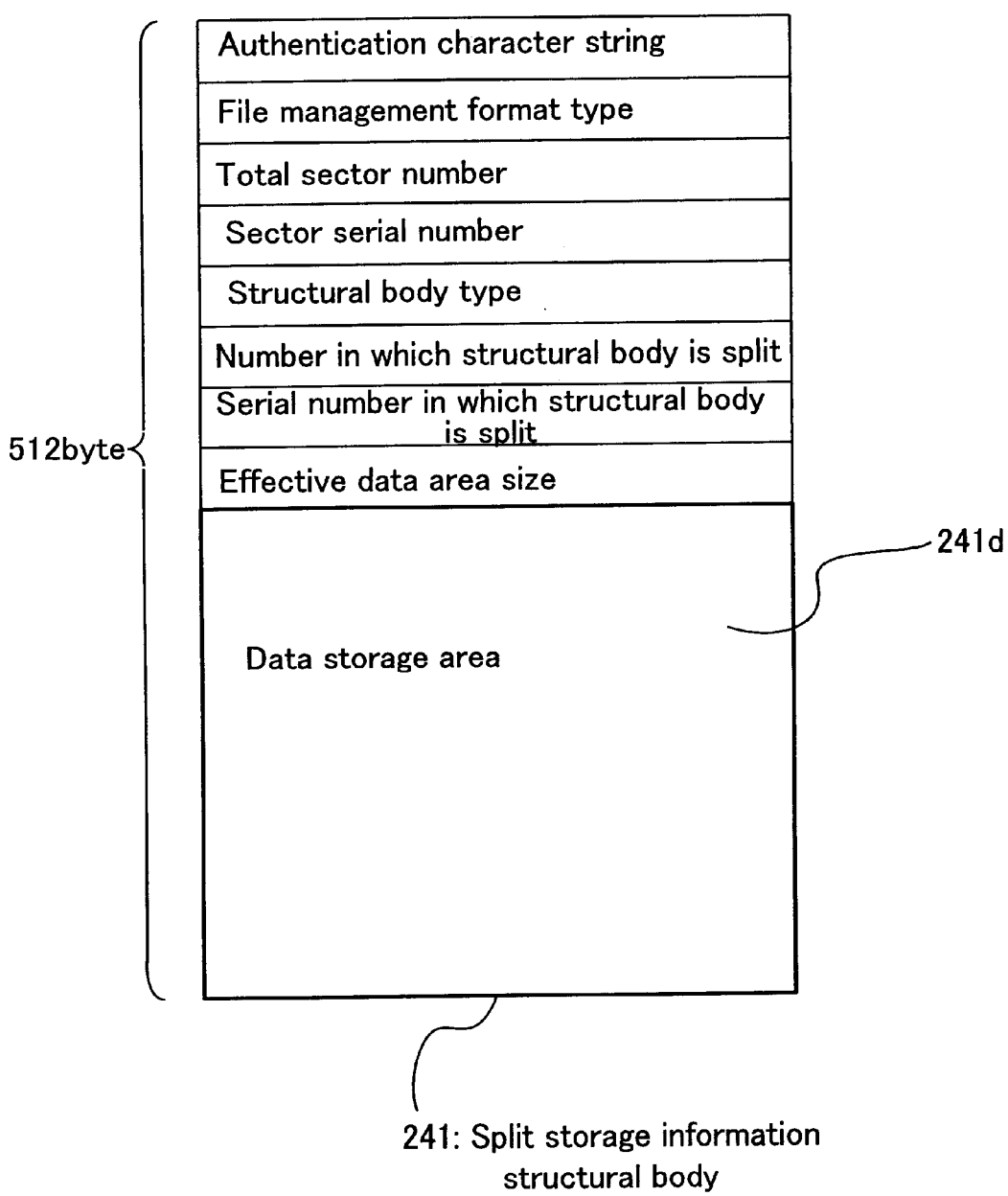
FIG. 8 is an arrangement example of split management information items.

Then, the inputting means 17 generates in the memory 5 a required number of split management information structural bodies 241 as shown in FIG. 8 that store split management information, i.e. information obtained by splitting file management information into a specific number m (hereinafter referred to as "split management information") (FIG. 13, Step S2).

The above-mentioned file management information is the file management information currently being managed by file management means 112 that is stored in the second recording means, such as a hard disk. Needless to say, therefore, this file management information does not include information on a stream data currently being written. It is also noted that the above-mentioned required number means the number required for splitting and storing the whole file management information and, in this case, corresponds to the total number m of file management information. In other words, the file management information can be classified into four as shown in FIG. 4—common information structural body 221, volume information structural body 222, stream information structural body 223 and vacant space information structural body 224.

One common information structural body 221 is provided for each object file. The volume information structural body 222 is a structural body to store information on logical space where an object file is stored. Generally, one structural body of this type is provided per file. The stream information structural body 223 is a structural body to store information on stream data that make up a file. This structural body is needed in the number of streams. The vacant space information structural body 224 is a structural body to store information on vacant files in the logical space where an object file is stored. One structural body of this type is allocated for every continuous space. It is understood that the total number m means the total number of the above-mentioned structural bodies.

These four kinds of structural bodies are formed in a manner that they do not exceed the size of the data storage area 241d(see FIG. 8) of the split management information structural body 241. Therefore, if m pieces of split management information structural bodies 241 (hereinafter referred to as "split management information structural bodies 241 (1)–(m)") are prepared as indicated above, the whole file management information can be split and stored.

In this stage, the inputting means 17 generates split management information structural bodies 241(1)–(m) as mentioned above, while acquiring those four kinds of structural bodies from the file management means 112 one after another and copies those structural bodies in the "data storage area" one after another. Furthermore, the inputting means 17 sets the following information on the split management information structural bodies 241(1)–(m).

That is, an authentication character string (split management information authentication character string) is set in the "authentication character string" field. Format type (version information) of file management information is acquired from the file management means 112 and set in the "format type" area. The total number m of split management information structural bodies split management information structural body 241 or the number of sectors required to store all the split management information structural bodies is set in the "total sector number" area. One of the serial numbers, that is, 1 to m generated by the split management information structural body 241 is set in the "sector serial number" area. An authentication character string indicting which of the four kinds of structural bodies is an object to be split and stored in the split management information structural body 241. Furthermore, the splitting number of information, an object to be split and stored, which will be described later, is set in the "number in which structural body is split" area. The serial numbers given split information, an object to be split and stored, in splitting order which will be described later are set in the "serial number in which structural body is split" area. The effective size of information, an object to be split and stored, is set in the "effective data region size" area.

As mentioned above, the four structural bodies are usually smaller in size than data storage area 241d, and, therefore, 1 is set for the "structural body splitting number" area and the "structural body splitting serial number" area. It is also noted that since the respective split management information structural bodies 241(m) are each stored in one sector (split management information storing sector 202), the size of the split management information structural body 241 is set at a sector size, that is, 512 bytes. (For the same reason, a writing time history information structural body 251 and a reading time history information structural body 252 which will be described later are also set at 512 bytes.)

In the next step, the inputting means 17 inquires of the recording buffer manager 16 about the area to store a stream data that will be inputted by the inputting means 17. Receiving this inquiry, the recording buffer manager 16 returns to the inputting means 17 pointer B 212 which will be described later (FIG. 13, Step S3, see FIG. 11).

Meanwhile, writing and reading in the hard disk is effected sector by sector. Therefore, in case one block of data is written in the hard disk, an area N times as large as the sector size is always used even if the data size for one block is specified as writing size of writing instructions. As a result, invalid data will be made in the final sector. In case data of 513 bytes is to be written in the hard disk, for example, two sectors—an area 1024 bytes in size—is used, because one sector in the hard disk is 512 bytes. In this case, the effective data in the second sector is the first one byte, and the remaining 511 bytes are invalid data.

In the present invention, therefore, the recording buffer manager 16 secures on the recording buffer 14 an area of the size given by this formula: (number N of sectors required for writing the block×sector size)+(sector size×3) as shown in FIG. 11. And if data of one block size is inputted from pointer B 212 at the top position of the third sector within the area of the above-mentioned N+3 sector sizes. The second sector from the end of the above-mentioned area of the above-mentioned N+3 sector has some excessive space. The retrieval information structural body 231 is stored in that excessive space (with the pointer C 213 at the top position).

Figure 11:
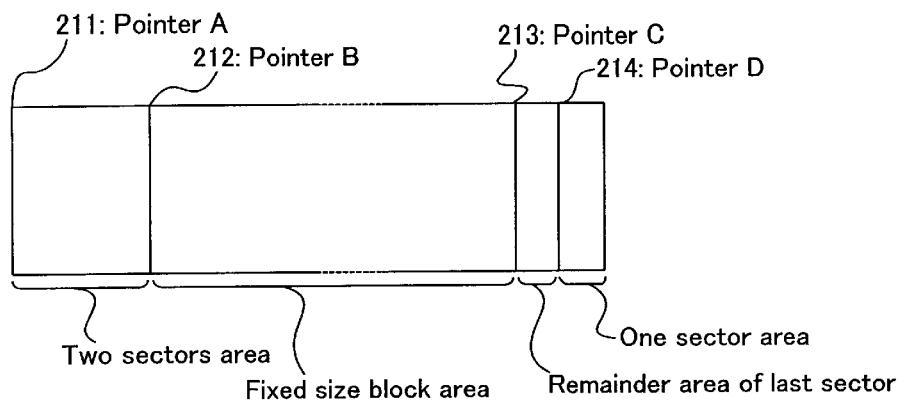
FIG. 11 is an illustration showing details of one memory block on the recording buffer.

The first two sectors (with pointer A at the head) and the last sector (with pointer D at the head) in the area secured in the memory 5 as shown in FIG. 11 are later described.

This way, the retrieval information structural body 231 is written in the excessive space in the second sector from the end of the above-mentioned area of the above-mentioned N+3 sector sizes, and the occurrence of invalid data can be kept to a minimum. The points where the memory formats (FIG. 3 (a)) in the hard disk 4 are not the same as the storing formats (FIG. 3 (b) and FIG. 11) of the memory block are also described later.

Then, the inputting means 17 instructs the I/O adapter 10 to store a stream data by specifying pointer B 212 acquired as described above. So instructed, the I/O adapter 10 stores the first block of the stream data, an object to be recorded, in the area indicated by the pointer B 212 (FIG. 13, Step S 4). While the storing is going on, the inputting means 17 is at rest.

When the storing is over, the inputting means 17 stores the retrieval information structural body 231 bearing serial number 1 in the area indicated by the pointer C 213 (see FIG. 11), and then stores the split management information structural body 241(1) in the area indicated by pointer D 214 (see FIG. 11) (FIG. 13, Steps S 5→S 6).

Then, the inputting means 17 informs the recording buffer manager 16 that the storing of the split management information structural body 241 is over, and at the same time hands over pointer A 211 to the recording management queue 15(1) (see FIG. 11). After that, the inputting means 17 activates the writing means 18 (FIG. 13, Steps S 7→S 8).

The above-mentioned procedure is performed with each block (FIG. 13, Step S 9: No). When the storing of a stream data in the last block is finished (FIG. 13, Step S 9: Yes), the inputting comes to a close.

In the above description, the split management information structural body 241(1) is stored at the pointer D 214 (FIG. 13, Step S 7), because the procedure is for storing the top block. In the procedure for inputting the second block, the split management information structural body 241(2) is stored there. In the procedure for inputting the third block, the split management information structural body 241(3) is stored there. That way, the procedure is repeated until the split management information structural body 241(m) is stored there. Then, the procedure is started with the split management information structural body 241(1) again. Split management information is thus stored in a cyclic manner.

Here is the explanation on the process (hereinafter referred to "writing") performed by the writing means 18 activated as described above in accordance with the flow chart shown in FIG. 14.

Figure 6:
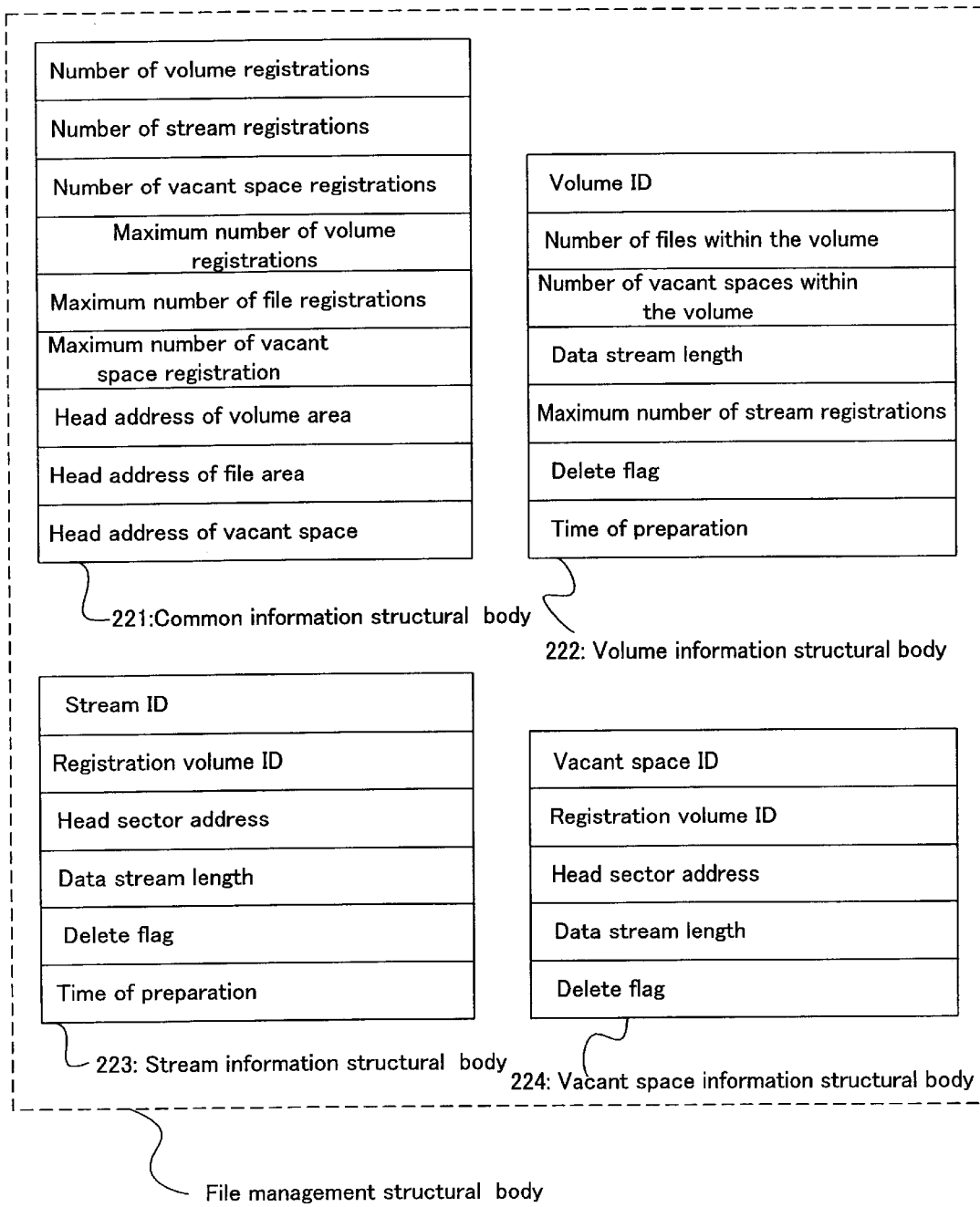
FIG. 6 is an arrangement example of file management information items.
Figure 14:
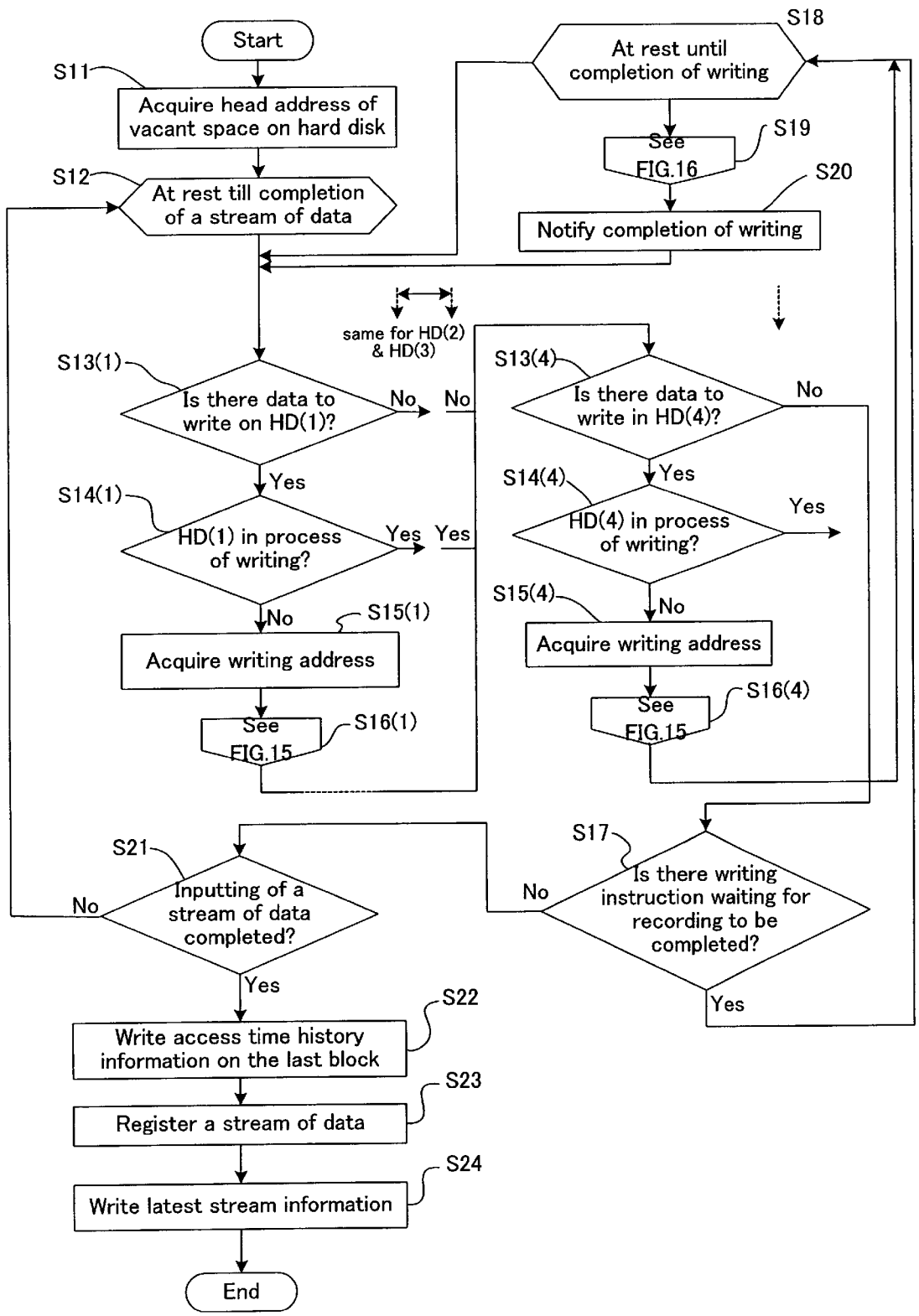
FIG. 14 is a flow chart showing the writing process in the first embodiment.

First, the writing means 18 acquires from the file management means 112 the head address of the vacant space in each hard disk 4(k) and goes to rest (FIG. 14, Steps S 11→S 12). It is noted that the file management means 112 specifies the head address in the aforesaid vacant space on the basis of the contents of the vacant space information structural body 224 (see FIG. 6).

Then, the writing means 18, which is re-activated by the inputting means 17 as described above (see FIG. 13, Step S 8), inquires of the recording buffer manager 16 about the presence of data to write. Receiving this inquiry, the recording buffer manager 16 returns to the writing means 18 the pointer A 211 (hereinafter referred to as "writing address") stored in the recording management queue 15(k) as described above (FIG. 14, Steps S 13(k)→S 14(k)→S 15(k)). If there is no data to write in the inquiry object, that is, the hard disk 4(k) (FIG. 14, Step S 13(k): No) or in case the inquiry object or the hard disk 4(k) is in the recording process (FIG. 14, Step S 14(k): Yes), however, the writing means 18 makes the same inquiry about the next hard disk 4(k).

Then, the writing means 18 issues a writing instruction to the hard disk 4(k) specified by the above-mentioned writing address (FIG. 14, Step S 16(k)).

Now, the process of issuing a writing instruction (FIG. 14, Step S 16(k)) is explained in detail with reference to FIG. 15.

Figure 15:
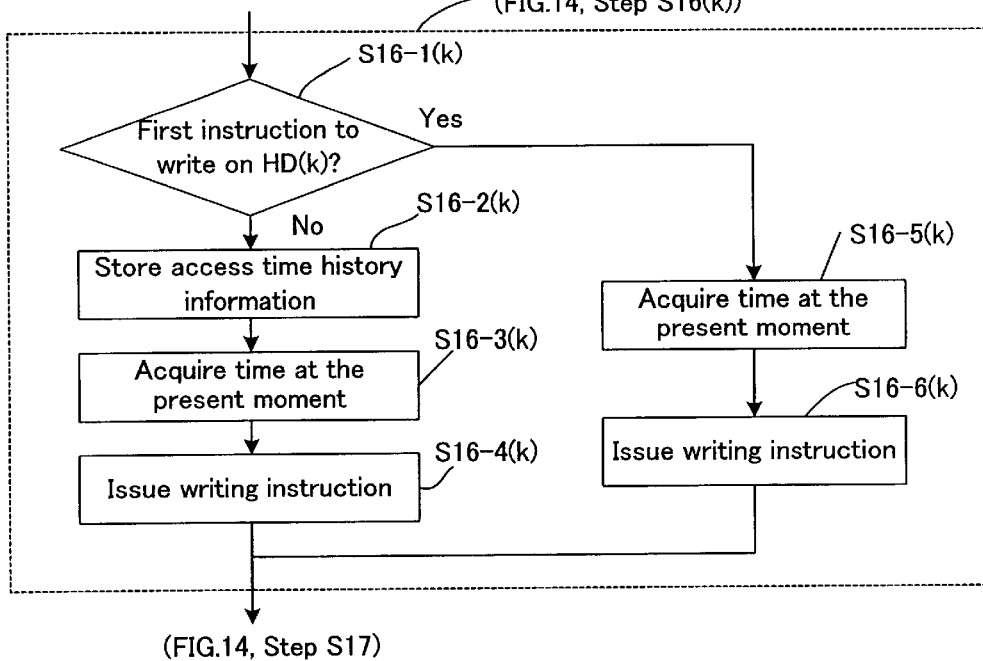
FIG. 15 is a flow chart showing the process of issuing writing instructions in the first embodiment.

First, the writing means 18 sees if the writing instruction is the first writing instruction (FIG. 15, Step S 16-1(k)). The expression "first writing instruction" as used herein means the first order to write ever issued in the current writing.

If the writing instruction is the first order to write, the writing means 18 acquires the present time from RTC 60 and stores this present time in the memory 5 as instruction issuing time. Upon storing the present time, the writing means 18 issues a writing instruction by specifying a size, that is, a size for N+1 sector—given by subtracting the size for two sectors from the N+sector size—from the address (pointer B) obtained by adding the size for two sectors to the address at the pointer A 211 (FIG. 15, Steps S 16-1(k)→S 16-5(k)→S 16-6(k)).

Figure 9:
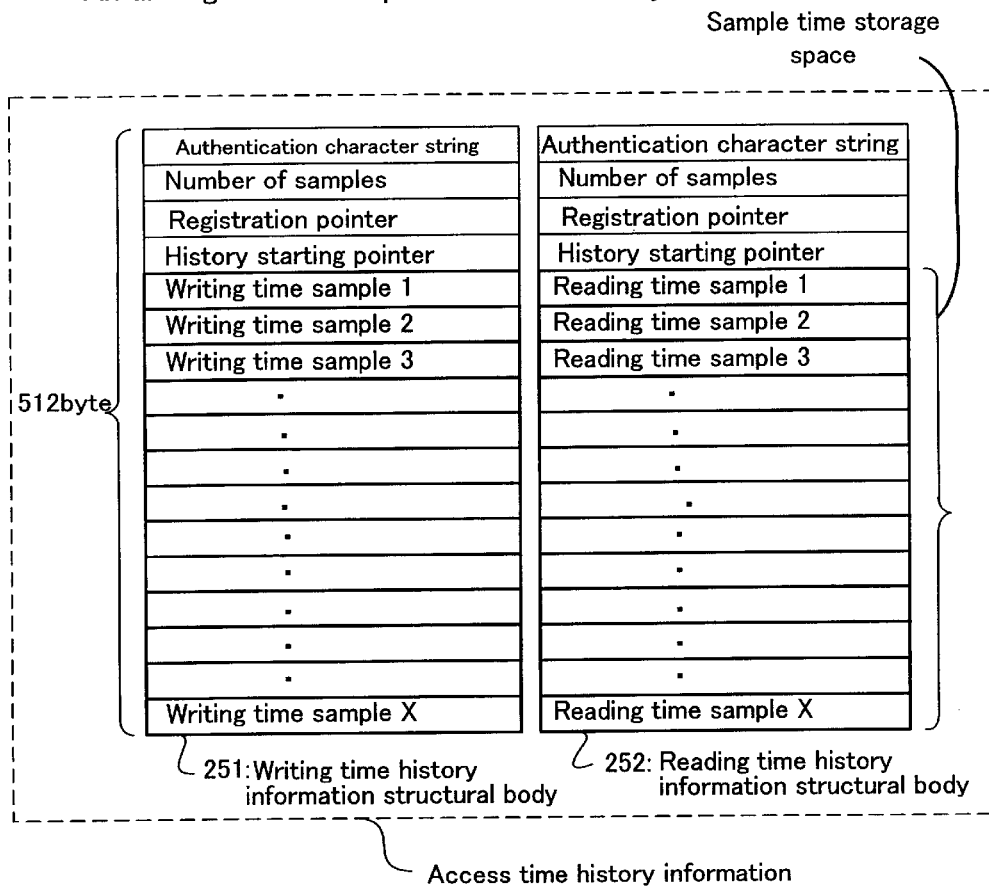
FIG. 9 is an arrangement example of access history information items.

The reason why the size for two sectors is added or subtracted is to store the access time history information (writing time history information structural body 251 and reading time history information structural body 252) shown in FIG. 9 in the area indicated by the pointer A 211 in the subsequent procedure.

Meanwhile, in case the writing instruction is the second or later writing instruction, the writing means 18 first stores the access time history information (of which the generation process will be described later) in the area indicated by the pointer A 211. Then, the writing means 18 retains in the memory 5 the time of issuing the writing instruction in the same way as above and immediately issues a writing instruction by specifying the address of the pointer A 211 and the size for the N+3 sectors. (FIG. 15, Steps S 16-1(k)→S 16-2(k)→S 16-3(k)→S 16-4(k)).

At this point, the memory block has "access time history information," "block," "retrieval information" and "split management information" stored from the head in that order. The information in the first quotation marks—"access time history information"—is not information on the "block" currently being written but on the block written previously. Suppose there are blocks A, B, C . . . , and access time history information A', B', C' . . . corresponding to those blocks, for example, the writing proceeds not this way: <writing of A>→<writing of A'>→<writing of B>→<writing of C> . . . but this way: <writing of A>→<writing of A'+B>→<writing of B'+C> . . . The mark < >indicates the scope of one writing. This procedure of writing by adding access time history information to the next block (writing A' along with B) keeps the number of writing instructions issued from increasing.

The writing means 18, which has issued writing instructions as set forth above, is at rest while each controller 6(k) is writing on the hard disk 4(k). When the writing is completed on any of the hard disks, the writing means 18 is re-started and generates access time history information (FIG. 14, Steps S 17→S 18→S 19).

Figure 16:
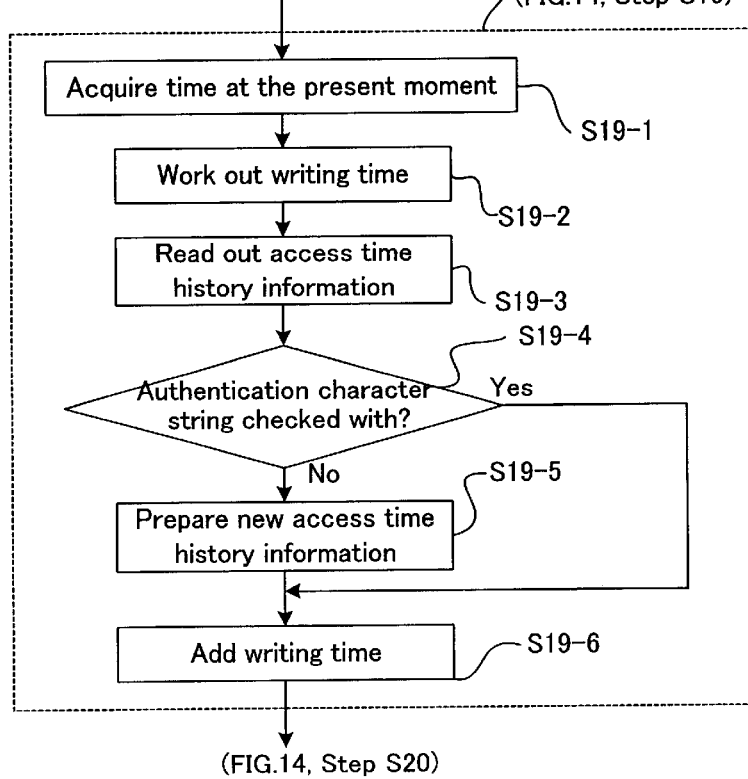
FIG. 16 is a flow chart showing the process of generating access history information.

With reference to the flow chart shown in FIG. 16, here is the detailed description on the process of generating access time history information by the writing means 18 which is re-activated after writing the first block on the hard disk 4(1) (FIG. 14, Step S 19) is completed.

First, the writing means 18 acquires the present time from the RTC 60, subtracts from the present time the time of issuing an instruction to write on the hard disk 4(1) stored in the memory 5 as mentioned above, and works out the time (hereinafter referred to as "writing time") from the point of issuing the writing instruction till completion of writing ((FIG. 16, Steps S 19-1→S 19-2).

Then, the writing means 18 secures an area for two sectors in the memory 5 and reads out access time history information storage sectors 203, 204 (see FIG. 3(*a*)). The writing means 18 then checks if an access time history information authentication character string is stored in the information thus read out (FIG. 16, Steps S 19-3→S 19-4).

If an access time history information authentication character string is found stored, the writing means 18 regards the information thus read out as access time history information and stores the aforesaid writing time at a specific position (initial value: position of "writing time sample 1" storage field) in the sample time storage filed of the writing time history information structural body 251 (FIG. 16, Steps S 19-4: Yes→S 19-6). In this connection, the writing means 18, which has finished storing the writing time, adds 1 to the history starting pointer (to specify the aforesaid specific position) in preparation for storing the next writing time. It is also noted that after the sample time storage field is full, old writing times will be overwritten one after another. In other words, data in the same area is read and written repeatedly, and each time the writing time is recorded to leave the history of the writing times in the area for later use in detecting defective sectors.

If no access time history information authentication character string is found stored, on the other hand, the writing means 18 regards this writing on the hard disk 4(1) as writing with no data written yet, that is, virgin writing with no access time history information structural body written on the hard disk yet. And the writing means 18 first generates newly on the memory 5 a writing time history information structural body 251 and a reading time history information structural body 252. Then, the writing time is stored in the same procedure as in case an access time history information authentication character string is found stored (FIG. 16, Steps S 19-4→S 19-5→S 19-6).

The access time history information used in the aforesaid step of issuing a writing instruction (FIG. 15, Step S 16-2(k)) is an access time history information generated there. That is, the access time history information with the writing time stored as mentioned above is stored by the writing means 18 in the area indicated by the aforesaid pointer A 211, and then written along with data on the next block size by the controller 6(k) in the aforesaid access time history information storage sectors 203, 204. It is noted that the storage format in the memory 5 in FIG. 11 is shown in FIG. 3(b) and the writing unit is shown in FIG. 3(c) so that the storage format on the memory 5 can be compared with the storage format to be stored on the hard disk 4.

The reading of the aforesaid access time history information storage sectors 203, 204 (FIG. 16, Step S 19-3) is effected while a stream data is being recorded, and it may be feared that such a reading could affect the recording performance. However, immediately before the reading, the magnetic head is at rest at the position where the reading is completed with the split management information storing sector 202. Therefore, the reading of the access time history information storage sectors 203, 204—the sector after the split management information storing sector 202—adds no seeking load on the magnetic head.

The writing means 18, which has added the writing time to the writing time history information structural body 251 as set forth above, informs the recording buffer manager 16 to the effect that the writing in the hard disk 4(1) is completed and at the same time stores a value indicating that writing at a specific position of the recording management queue 15(1) corresponding to the hard disk 4(1) is finished (FIG. 14, Step S 20).

Then, the writing means 18, which has been at rest (FIG. 14, Step S 18), is re-activated not only in the aforesaid case—when the writing in any hard disk 4(k) is finished—but also when the inputting means 17 issues a re-activation order (FIG. 13, Step S 8). In that case, however, the process shifts to the step in which the writing means 18 inquires of the recording buffer manager 16 if there is data on the memory 5 to be written (FIG. 14, Steps S 18–S 13(k)).

As set forth above, according to the present invention, in case there is a stream data in the next hard disk, say, 4(2), when the instruction to write in a hard disk, say, 4(1), is completed, an instruction for writing in the next hard disk 4(2) is issued immediately. That means that writing instructions are issued to hard disks 4(1)–4(4) in parallel. That minimizes the idling time of the hard disk 4(k) and the idling time of the host bus 1, and permits continuous recording of a stream data.

In case no writing address is present in the respective recording management queues 15(k) and in addition the inputting of a stream data is finished (FIG. 14, Step S 21: Yes), the writing means 18 writes in the respective hard disks 4(k) the access time history information of the block in which information was written last (last block) and then refers to the file management means 112 the retrieval information generated as described above. That ends registration of a stream data (FIG. 14, Steps S 22→S 23). It is natural that access time history information on the last block needs to be written (FIG. 14, Step S 22), if the storage format and the recording format are considered different.

Here it is so arranged in preparation for recovery (recovery process 2) that a stream information structural body 223 (information indicating that the data is the latest stream information) is generated and that this stream information structural body 223 is written in the latest stream information storing sector 200 (FIG. 14, Step S 24). Either the writing means 18 or the file management means 112 may generate the aforesaid stream information structural body 223.

As a result, a stream data in the format shown in FIG. 3 is recorded in the hard disk (k).

(Reproduction Process)

Now, the process of reproducing a stream data recorded as described above is explained.

First, in case need arises to reproduce a stream data recorded on the hard disk 4 when an application (not shown) or the like directs the controller 6(k) of SCSI adapter 2(k) to reproduce data, reading means included in the reproduction control means 113 under the control of CPU 9 starts up.

Figure 5:
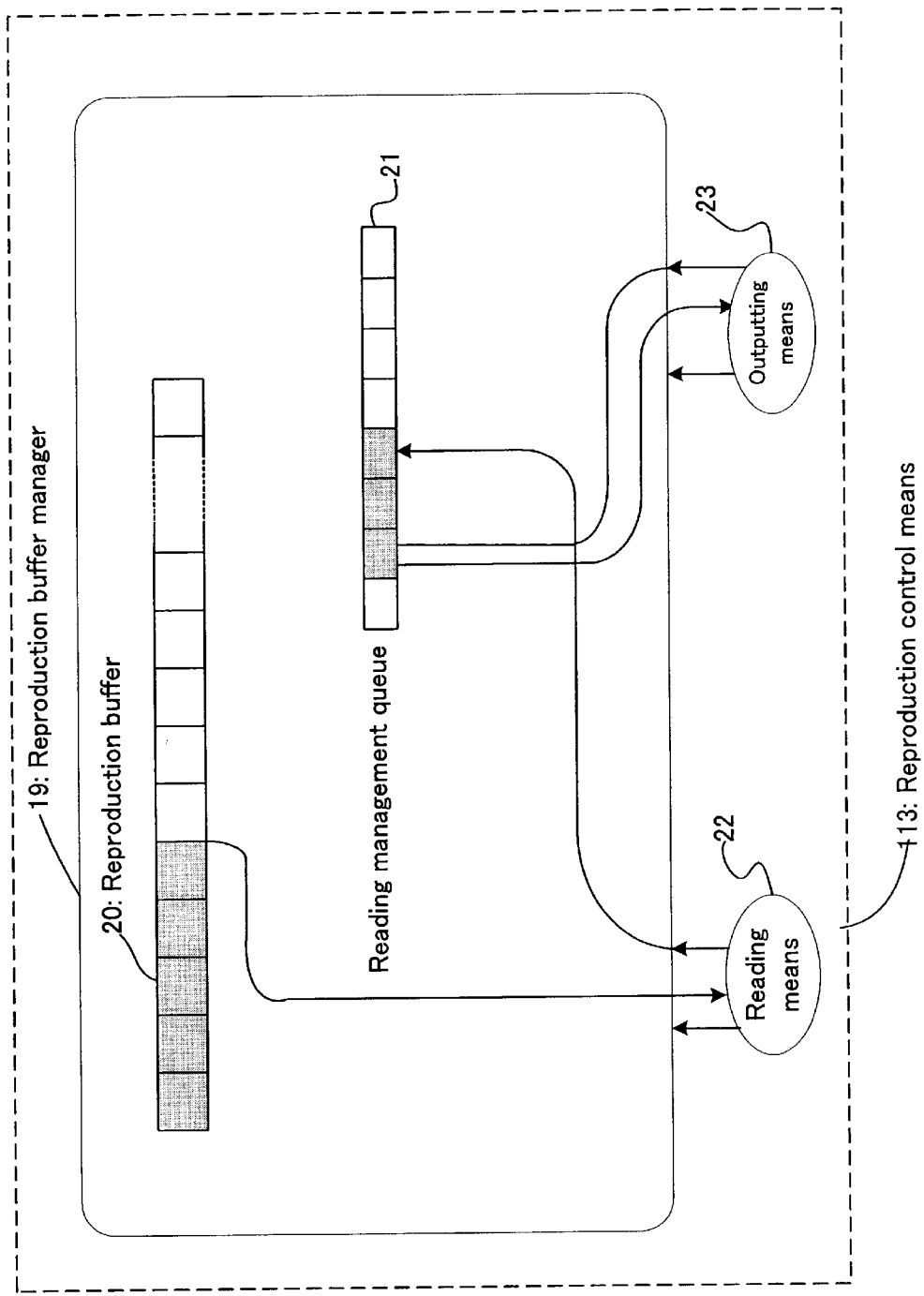
FIG. 5 is a diagrammatic illustration of a reproduction means.
Figure 12:
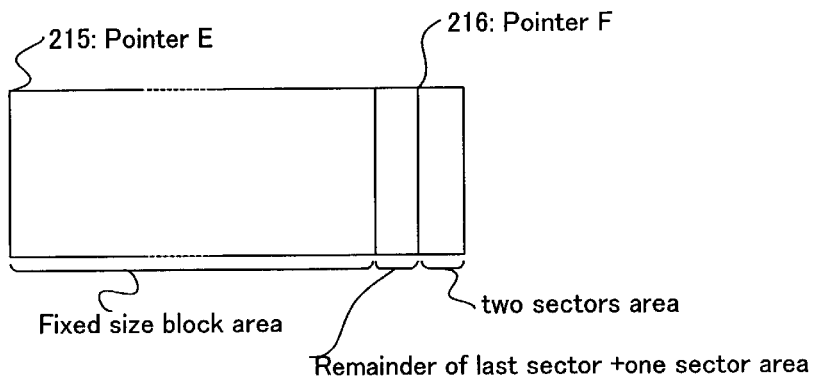
FIG. 12 is an illustration showing details of one memory block on the reproduction buffer.

In other words, reproduction control means 113 comprises reading means 22, outputting means 23 and a reproduction buffer manager 19 as shown in FIG. 5. This reproduction buffer manager 19 manages a reproduction buffer 20 (details of a memory block are shown in FIG. 12) to store a stream data in blocks and a reading management queue 21 that has a specific address on the reproduction buffer 20. The reproduction buffer 20 and the reading management queue 21 are both formed within the memory 5.

Here is an explanation on the process of reading (hereinafter referred to as "reading") by the reading means 22 reactivated as described above with reference to the flow chart shown in FIG. 17.

First, the reading means 22 inquires of the file management means 112 about the presence of data to read (to reproduce). Receiving the inquiry, the file management means 112 returns to the reading means 22 the head address of the area on the hard disk 4 where data to read is recorded (FIG. 17, Step S 30). In this connection, the file management means 112 specifies the aforesaid head address on the basis of the stream information structural body 223 (see FIG. 6) or the like.

Then, the reading means 22 reads out data to reproduce and inquires of the reproduction buffer manager 19 for a space on the memory 5 to store the data temporarily. Receiving the inquiry, the reproduction buffer manager 19 returns to the reading means 22 the address (storage address) of a vacant space in the reproduction buffer 20 on the memory 5 (FIG. 17, Steps S 31→S 32: Yes).

Then, the reading means 22 first determines the number and area of the hard disk 4(k), an object to read, on the basis of the head address acquired as described above, and then acquires the present time from the RTC 60. Upon storing this present time as the time of issuing the reading instruction in the memory 5, the reading means 22 issues a reading instruction to the controller 6(k) for the hard disk 4(k) (FIG. 17, Steps S 33→S 34).

The reading size of the aforesaid reading instruction is the size of the memory block shown in FIG. 12. Instructed to read, the controller 6(k) read from the head sector of the block to the reading time history information storage sector 204. During the reading, the reading means 22 is at rest (FIG. 17, Step S 35).

Figure 17:
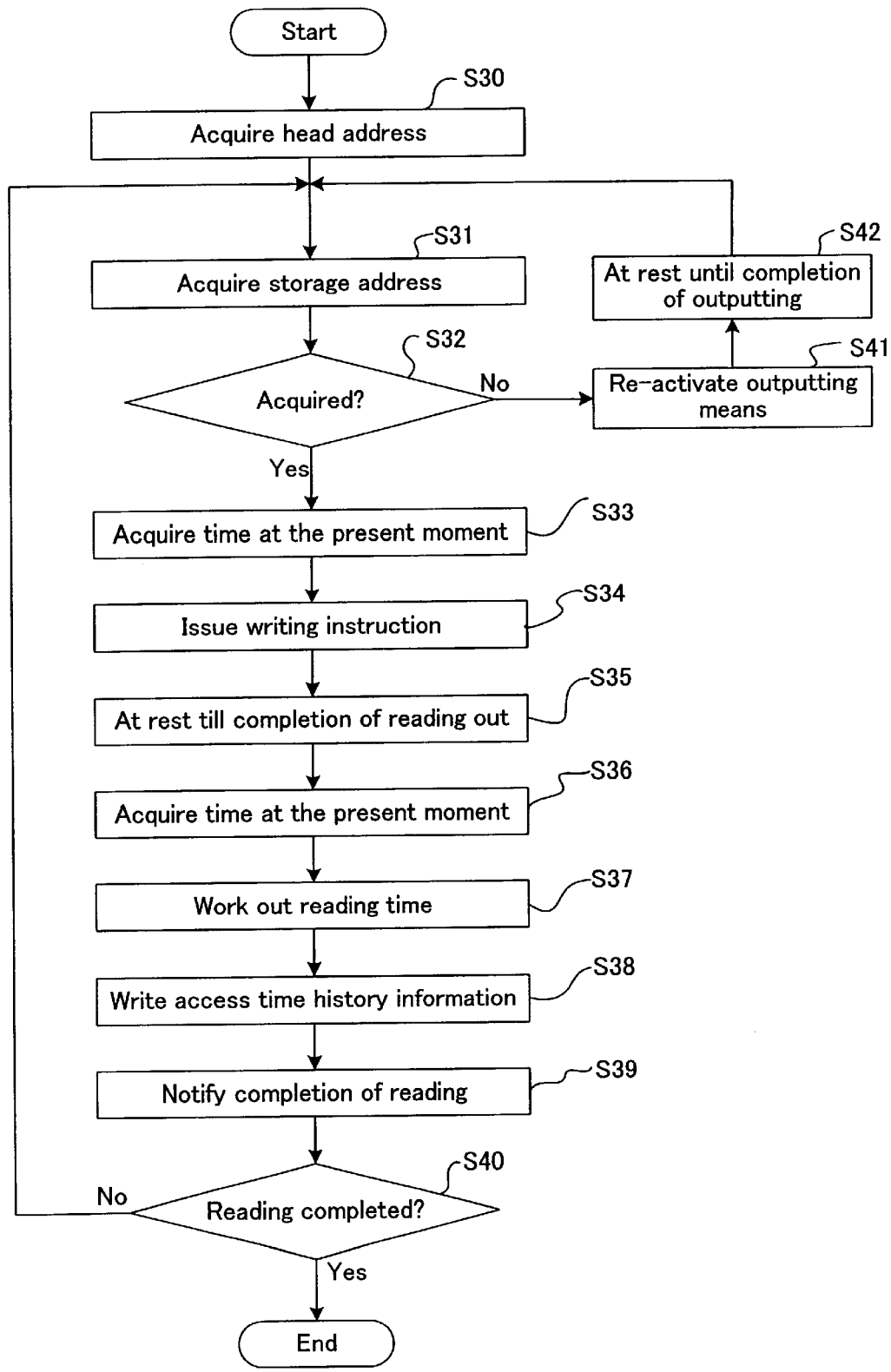
FIG. 17 is a flow chart showing the reading process in the first embodiment.

Then, the reading means 22 acquires the present time from the RTC 60, subtracts from the present time the time of issuing an instruction to read which is stored in the memory 5 as mentioned above, and thus works out the time (hereinafter referred to as "reading time") from the point of issuing the reading instruction till completion of reading (FIG. 17, Steps S 36→S 37).

In this step, the reading means 22 stores the reading time thus worked out at the position indicated by the current history starting point (initial value: position of "reading time sample 1" storage area as shown in FIG. 9) (FIG. 17, Step S 38). The reading process is identical with the writing process in that 1 is added to the history starting point and that old sample times are overwritten.

Then, the reading means 22 informs the reproduction buffer manager 19 that the reading is completed and at the same time sets the storage address starting with the head of the reading management queue 21 (FIG. 17, Step S 39).

In this step, if the aforesaid process continues, the vacant space in the reproduction buffer 20 is used up and the reading means 22 cannot acquire a storage address. When the vacant space in the reproduction buffer 20 is used up, therefore, the reading means 22 re-activates the outputting means 23 and goes to rest (FIG. 17, Steps S 31→S 32: No→S 41→S 42).

Figure 18:
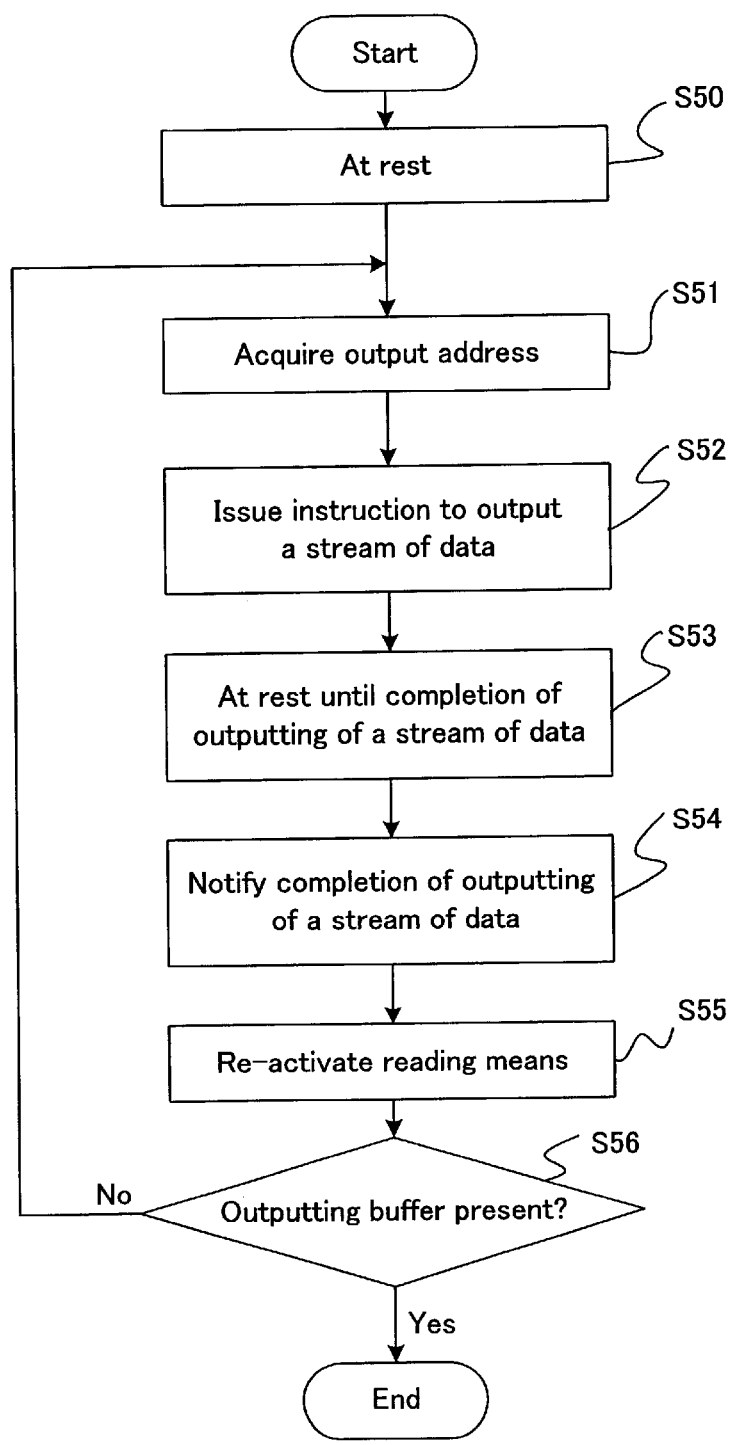
FIG. 18 is a flow chart showing the outputting process in the first embodiment.

Now, here is an explanation on the process (hereinafter referred to as "outputting") performed by the outputting means 23 with reference to the flow chart shown in FIG. 18.

The outputting means 23, which has been re-activated by the reading means 22 as mentioned above, inquires of the reproduction buffer manager 19 for a space where data is to be outputted. Receiving the inquiry, the reproduction buffer manager 19 returns to the outputting means 23 the address of the area where the data to output is present—an address on the reproduction buffer 20—(hereinafter referred to as "output address") (FIG. 18, Steps S 50→S 51).

Then, the outputting means 23 instructs the I/O adapter 10 to output the data in the block which is stored at the output address acquired as mentioned above. So instructed, the I/O adapter 10 rebuilds the aforesaid block data into a stream data and outputs the same to an application (not shown) or the like (FIG. 18, Step S 52). Thus, the application or the like starts reproduction of the stream data.

When the outputting is completed, the outputting means 23 is re-activated. The re-activated outputting means 23 informs the reproduction buffer manager 19 that the outputting of a stream data is over, and at the same time sets on the reading management queue 21 a value indicating that the outputting of a stream data is finished (FIG. 18, Steps 53 S→S 54).

When the outputting is completed, a space for one block is freed up in the reproduction buffer 20. Therefore, the outputting means 23 re-activates the reading means 22 (FIG. 18, Step S 55). The re-activated reading means 22 then acquires the address of the vacant address (FIG. 17, Steps S 42→S 31). That way, reading can always be effected on a vacant space in the reproduction buffer 20.

(Recovery Procedure 1)

Now, the process will be described of recovering a file management information using the aforesaid retrieval information when the file management information is broken owing to some trouble with reference to the flow charts shown in FIG. 19 and FIG. 20.

First, when the user inputs the recovery conditions or information which will be described later, recovering means 114 initializes the status of authenticating the status to a "vacant space," a frame counter—counter to count the number of blocks—to 0 and the head frame of the vacant space and the head frame of the stream to 0. It is noted that those set values are stored in a specific area on the memory 5 (FIG. 19, Steps S 60→S 61).

According to the present invention, the date information and author information are stored in the retrieval information structural body 231. Therefore, the recovery conditions or information to be inputted are information on the date, author and so forth, for example, "Recover a stream data on and after D-th day of the M-th month in the Y-th year" or "Recover a stream data prepared by Mr. So and So."

Figure 19:
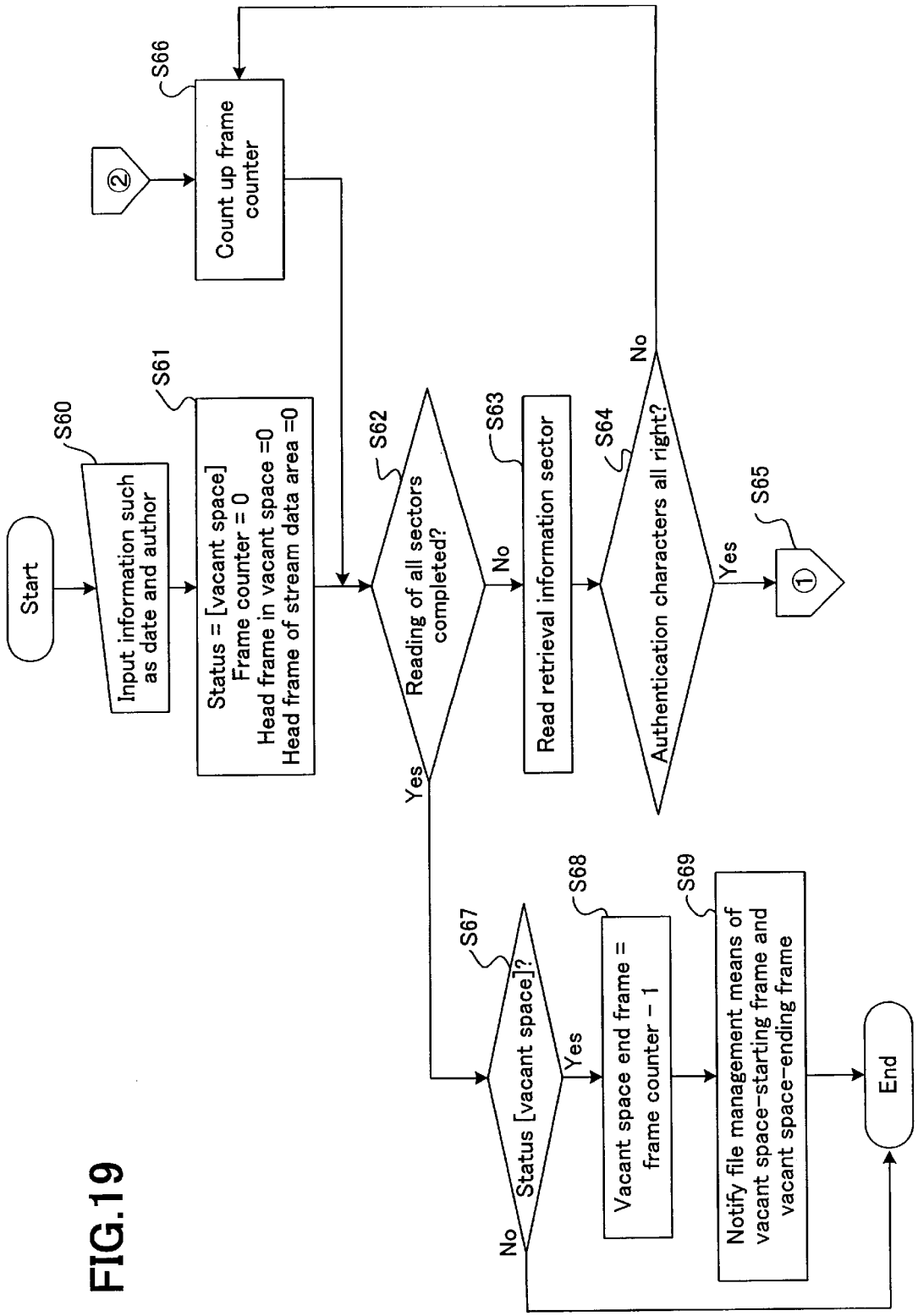
FIG. 19 is a flow chart showing the process of recovering data on the basis of retrieval information.

Then, the recovering means 114 reads out the first retrieval information structural body 231 on the hard disk 4(1) and checks if a retrieval information authentication character string is stored in the information thus read out (FIG. 19, Steps S 62→S 63→S 64).

Confirming that the authentication character string is stored, the recovering means 114 checks to see if the status is a "vacant space." If the status is found to be a "vacant space," the recovering means 114 further checks if the serial number is 0, that is, it is the stage where the first retrieval information structural body 231 is just read out. If it is the stage where the first retrieval information structural body 231 is just read out, the recovering means 114 confirms that the information on the date and information on the author stored in the retrieval information structural body 231 meet the indicated and inputted recovery conditions as mentioned above. After that, the status is set to "stream space" with the frame counter value as value of the head frame in the frame area (FIG. 19, Steps S 64: Yes→FIG. 20, Steps S 65-0→S 65-1→S 65-2→S 65-3→S 65→S 65-41→S 65-42).

Then, the recovering means 114 counts up the frame counter and reads out the next retrieval information structural body 231 ((FIG. 19, Step S 66).

Figure 20:
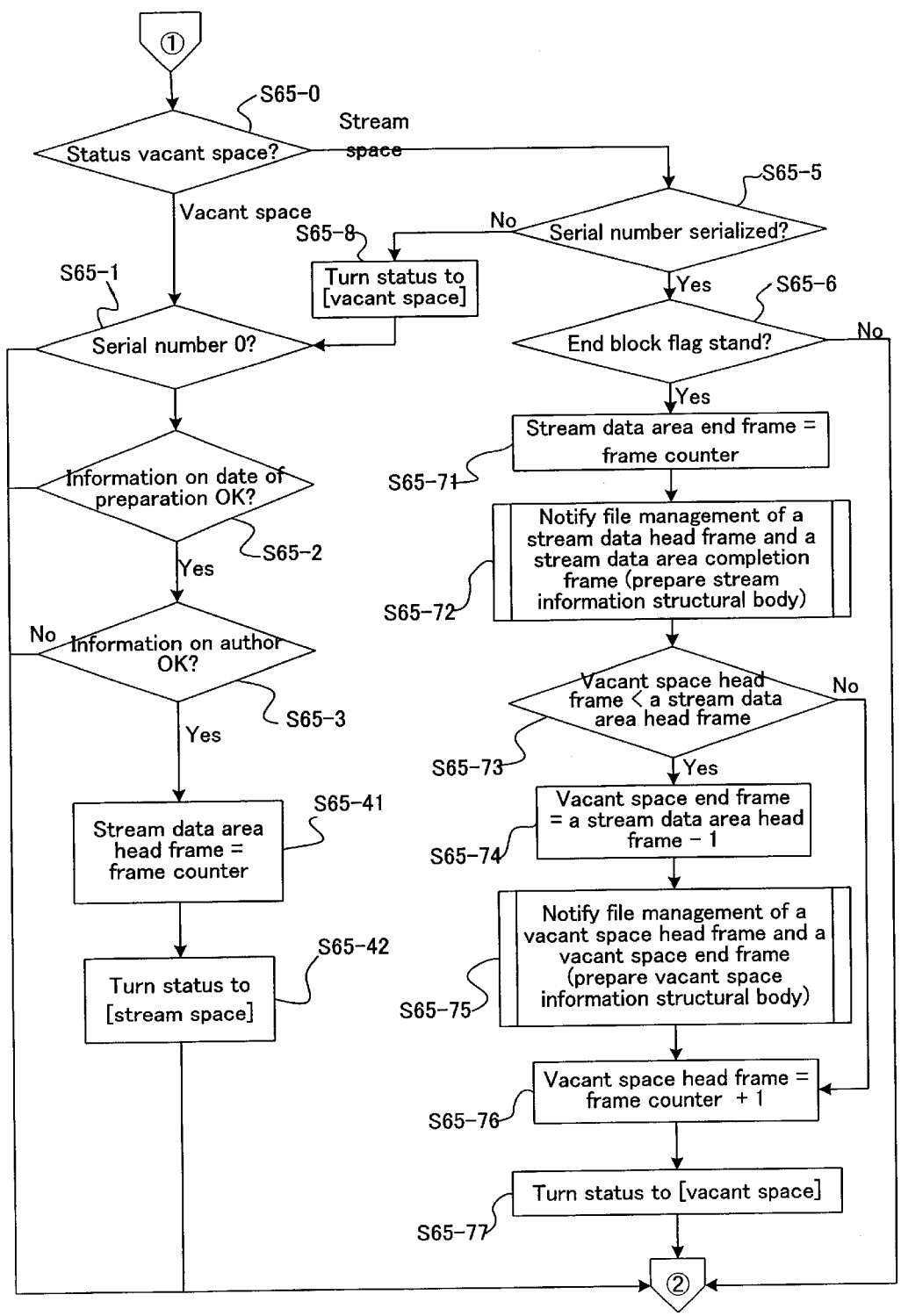
FIG. 20 is a flow chart showing part of the process of recovering data on the basis of retrieval information.

After confirming that the serial number stored in the retrieval information structural body 231 thus read out is serialized—the preceding serial number+1—, the recovering means 114 judges if an end block flag stands in the retrieval information structural body 231 (FIG. 19, Steps S 66→S 62→S 63→S 64→FIG. 20, Steps S 65-5→S 65-6).

If an end block flag stands, the recovering means 114 takes the current frame counter value as the stream area end frame value and informs the file management means 112 of the head frame value and the end frame value (FIG. 20, Steps S 65-71→S 65-72). With those, the file management means 112 can prepare a stream information structural body 223 for space (I) as shown in FIG. 21(a), for example.

At this moment, the vacant space head frame=0 and the stream area head frame=0. At the stage when the two are compared, the answer is negative, and the vacant space head frame value is set at the current frame counter value+1 (designated "α") while the status is set to "vacant space" (FIG. 20, Steps S 65-73: No→S 65-76→S 65-77).

Figure 21:
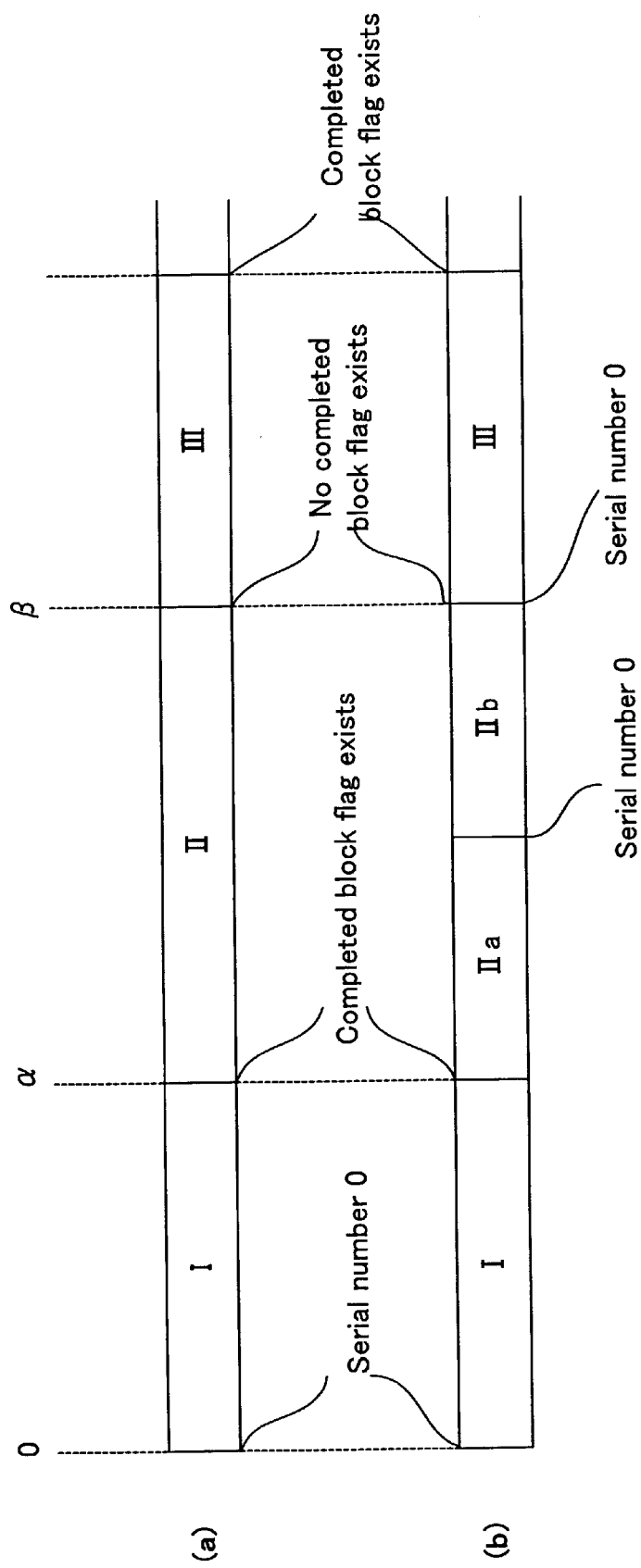
FIG. 21 is a diagrammatic illustration showing data being recovered on the basis of retrieval information.

In this connection, different stream data are overwritten on the hard disk a number of times and chances are some unnecessary data could be written as in area (II) in FIG. 21(a). Here, an assumption is made that the head retrieval information serial number in the unnecessary data is not 0 and that no end flag stands.

In this case, the process is considered of continuously acquiring retrieval information from area (I) to area (II). In the stage after the stream information structural body 223 of area (I) is prepared as mentioned above, the status is set to "vacant space" (FIG. 20, Step S 65-76). Then, the process goes through the stage of counting up the frame counter ((FIG. 19, Step S 66) and repeats acquisition of retrieval information of the next block. Furthermore, when the process reaches the stage where the first block retrieval information in the stream data space of area (III) in FIG. 21(a) is acquired, the frame counter value (designated "β") at the moment is set as stream space head frame value and the status is set to "stream space" (FIG. 20, Steps S 65-41, S 65-42).

Then, the routine process on the right-hand side in FIG. 20 is repeated, and if an end block flag stands, a stream information structural body 223 is prepared as mentioned above (FIG. 20, Step S 65-62). Then, the vacant space head frame space=α and the stream space head frame=β, and with the vacant space end frame as the aforesaid β−1, the aforesaid vacant space head frame α and the aforesaid vacant space end frame β−1 are given to the file management means file management means 112. And a vacant space information structural body 224 for area (II) is prepared (FIG. 20, Steps S 65-73: Yes→S 65-74→S 65-75).

Even if the aforesaid area (II) has a space (IIb) with the serial number beginning with 0 as shown in FIG. 21(b), the status in this area (IIb) turns to "stream space" (FIG. 20, Step S 65-42). After that, the routine process of S 65-6 No→S 66 in FIG. 19 and FIG. 20 will be repeated. Furthermore, the stream space head frame is renewed (=β) in the head frame of area (III) (FIG. 20, Steps S 65-5→S 65-8→S 65-1–S 65-42). Then, a stream information structural body 223 for area (III) is prepared. After that, a vacant space information structural body 224 for area (II) will be prepared.

The aforesaid procedure is performed with all the sectors, and stream information structural bodies 223 on all the stream data that meet the aforesaid recovery conditions can be generated on hard disks 4(1)–(4).

If the status is a "vacant space" in the stage when the process for all the sectors is completed, then the vacant space head frame set in Step S 65-76 (or initial setting at 0) with the frame counter value−1 as vacant space end frame value will be notified to the file management means 112. On the basis of that, the file management means 112 prepares a vacant space information structural body 224 (FIG. 19, Steps S 67–S 69).

In the next step, the recovering means 114 generates a vacant space information structural body 224 on the basis of the stream information structural body 223 generated as mentioned above. That is, the area specified by the stream information structural body 223 is an area where a stream data is recorded (stream space), and therefore, if the area other than this stream space is taken as vacant space, all vacant space information structural bodies 224 can be generated.

As set forth above, according to this embodiment, with retrieval information including the date, author and the like added, a stream data is recorded. Therefore, file management information can be recovered on the basis of the data, author and the like.

In addition, this recovery method permits recovery of the latest stream data unlike Recovery Procedure 2.

(Recovery Procedure 2)

The procedure of recovering broken file management information using the aforesaid split management information is described with reference to the flow charts shown in FIG. 22 and FIG. 23.

Figure 22:
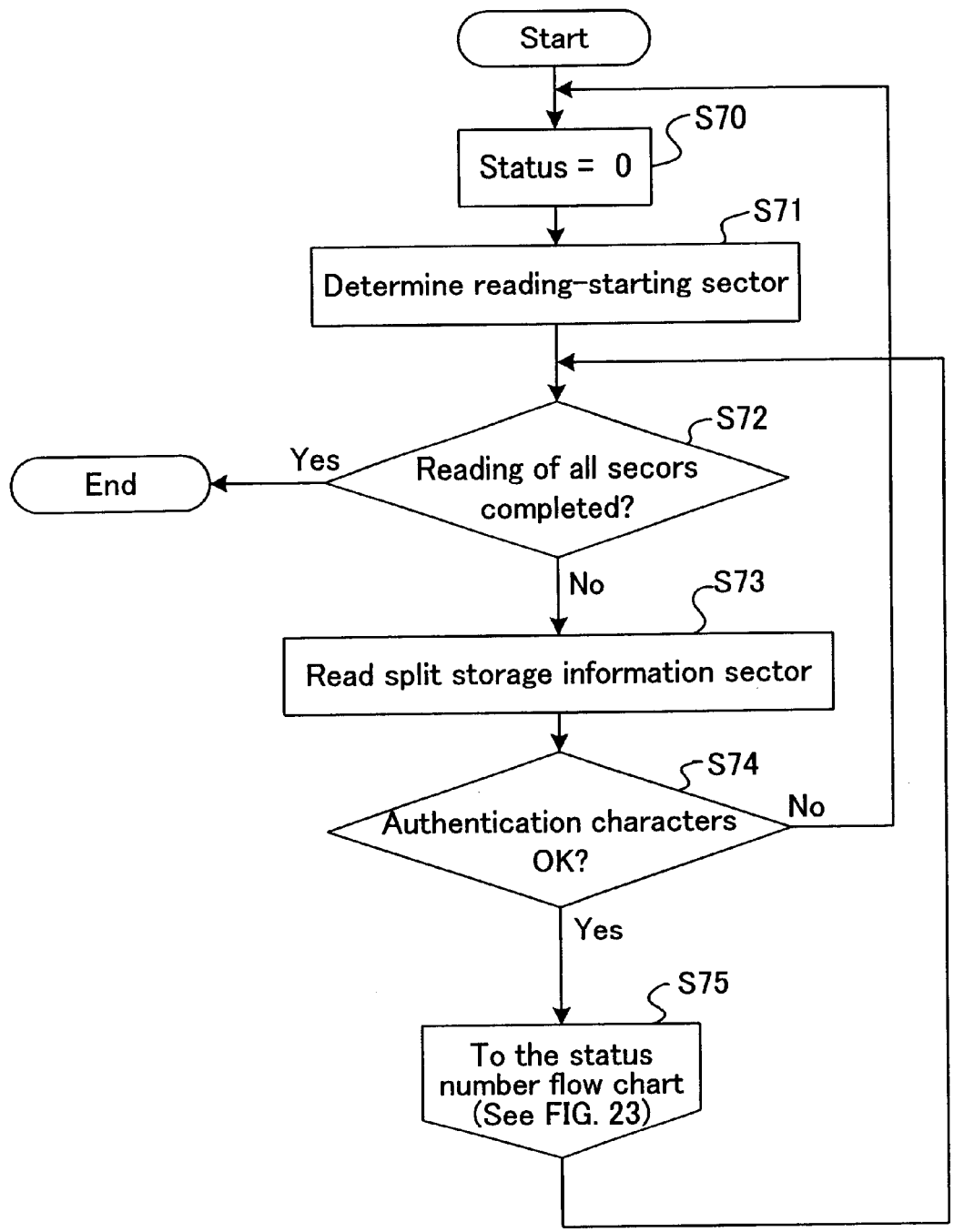
FIG. 22 is a flow chart showing the process recovering data on the basis of split management information.

First, the user inputs instructions to start the recovery procedure, and the recovering means 114 initializes the status number (sets to 0), stores this status number in a specific area of the memory 5 and chooses the reading-starting sector (FIG. 22, Steps S 70→S 71).

It is understood that the reading-starting sector means the head sector of the split management information storing sectors 202 (total number m) where split management information to recover is stored and which is specified by the "head address" of the stream information structural body 223 stored in the latest stream information storage sector 200.

Then, the recovering means 114 reads out the reading-starting sector thus chosen, and checks if a split management information authentication character string is stored in the information thus read out (FIG. 22, Steps S 72→S 73→S 74).

After confirming a split management information authentication character string is stored, the recovering means 114 confirms that the file management format type information stored in the split management information structural body 241 is the latest version, that is, the same as the information managed by the file management means 112 now. Furthermore, the recovering means 114 ensures that the sector serial number stored in the split management information structural body 241 is 1 (FIG. 22, Steps S 74: Yes→FIG. 23, S 75-1→S 75-2).

Figure 23:
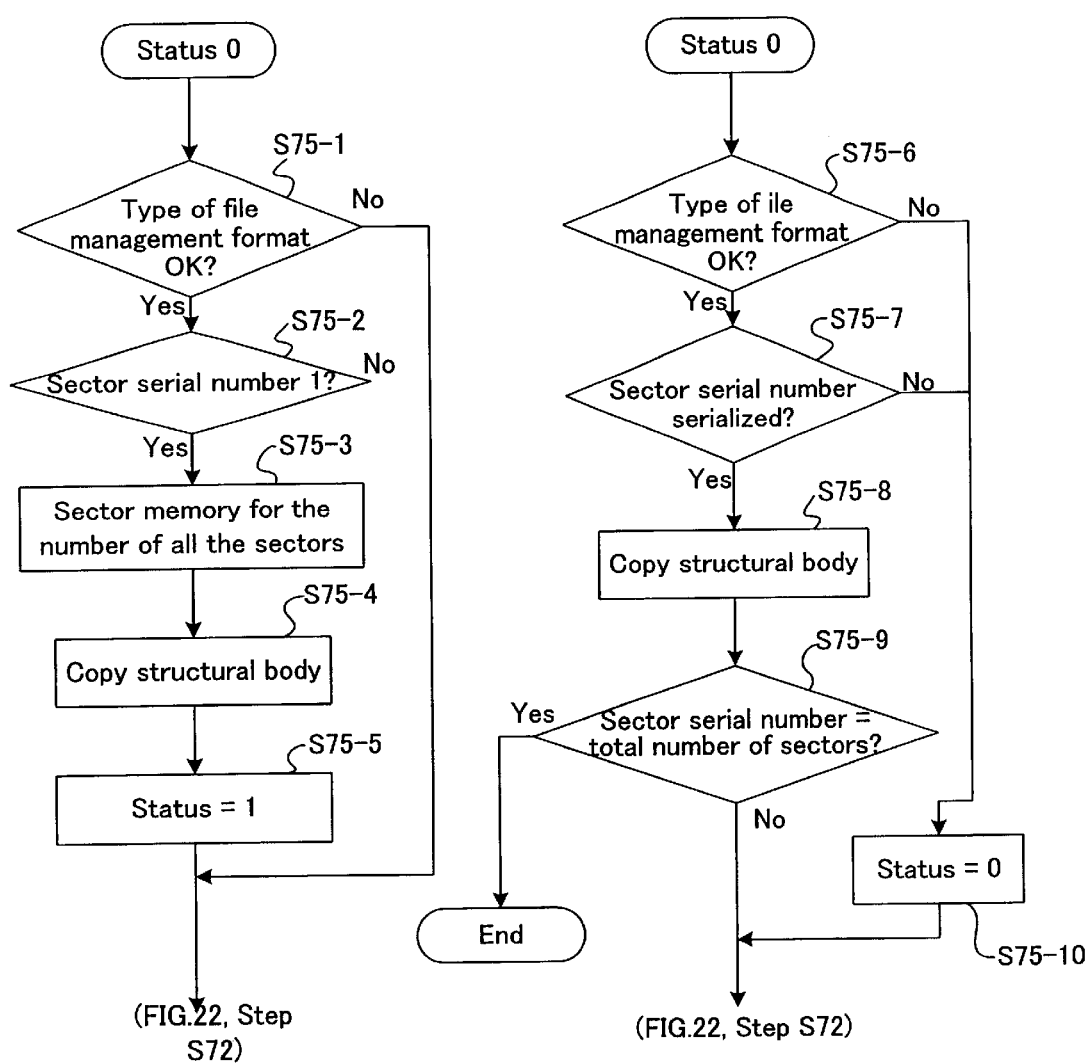
FIG. 23 is a flow chart showing part of the process of recovering data on the basis of split management information.

After confirming that the sector serial number is 1, the recovering means 114 works out "sector size×total number of sectors" on the basis of the information set in the "total sector number area" in the split management information structural body 241, and secures on the memory 5 the area of the size thus worked out (FIG. 23, Steps S 75-2: Yes→S 75-3). Hereinafter, the memory area thus secured is referred to as "memory area (1)–(m)."

Then, the recovering means 114 copies the first split management information structural body 241 on the memory area (1) secured as mentioned above and sets the status number to 1 (FIG. 23, Steps S 75-4→S 75-5).

Furthermore, the recovering means 114 reads out split management information structural body 241 from the next split management information storing sector 202 and checks the file management type and sector serial number with the split management information structural body 241 thus read out. After that, the recovering means 114 copies the split management information structural body 241 on the memory area (2) (FIG. 22, Steps S 72→S 73→S 74→FIG. 23, Steps S 75-6→S 75-7→S 75-8).

That procedure (FIG. 22, Steps S 72→S 73→S 74→FIG. 23, Steps S 75-6→S 75-7→S 75-8→S 75-9: No→FIG. 22, Step S 72). When "sector serial number=total number of sectors," the process comes to an end (FIG. 23, Step S 75-9: Yes).

As a result, all the split management information structural bodies 241 are stored on the memory areas (1)–(m). And data (one of all four structural bodies or file management information) stored in the data storage areas of those split management information structural bodies 241 are handed over to the file management means 112, and all the file management information can be recovered.

The recovery procedure has been described on the assumption that all the four kinds of file management information or structural bodies are smaller in size than the data storage area 241d of the split management information structural body 241. In case any of the four kinds of structural bodies is larger in size than the data storage area 241d, data stored in a plurality of the data storage areas are combined and recovered as one structural body. That such a combination is possible is evident from the arrangement of the split management information structural body 241 ("number of split structural bodies," "structural body splitting serial number").

It is also noted that file management information is always generated after a certain file is stored in the recording medium, and the file management information of the stream immediately before the latest stream information is stored is divided and stored in the latest stream information. In this recovery method, therefore, the latest stream data can not be recovered.

Two recovery procedures have been described. Needless to say, those recovery procedures may be applied in combination.

Embodiment 2

According to the present embodiment, the procedure for detection of defective regions is periodically performed so as to prevent the deterioration in stream data recording and reproduction performance.

(Procedure for Detection of Defective Region)

In case need arises to start the procedure for detection of defective region as when the user inputs instructions to detect defective regions, the defective region detection means 115 is re-activated under the control of CPU 9. Re-activated, the defective region detection means 115 first reads out the first access time history information storage sectors 203, 204 on the hard disk 4(1) and checks if an access time history information authentication character string is stored in the information thus read out (FIG. 24, Steps S 80→S 81→S 82).

Figure 24:
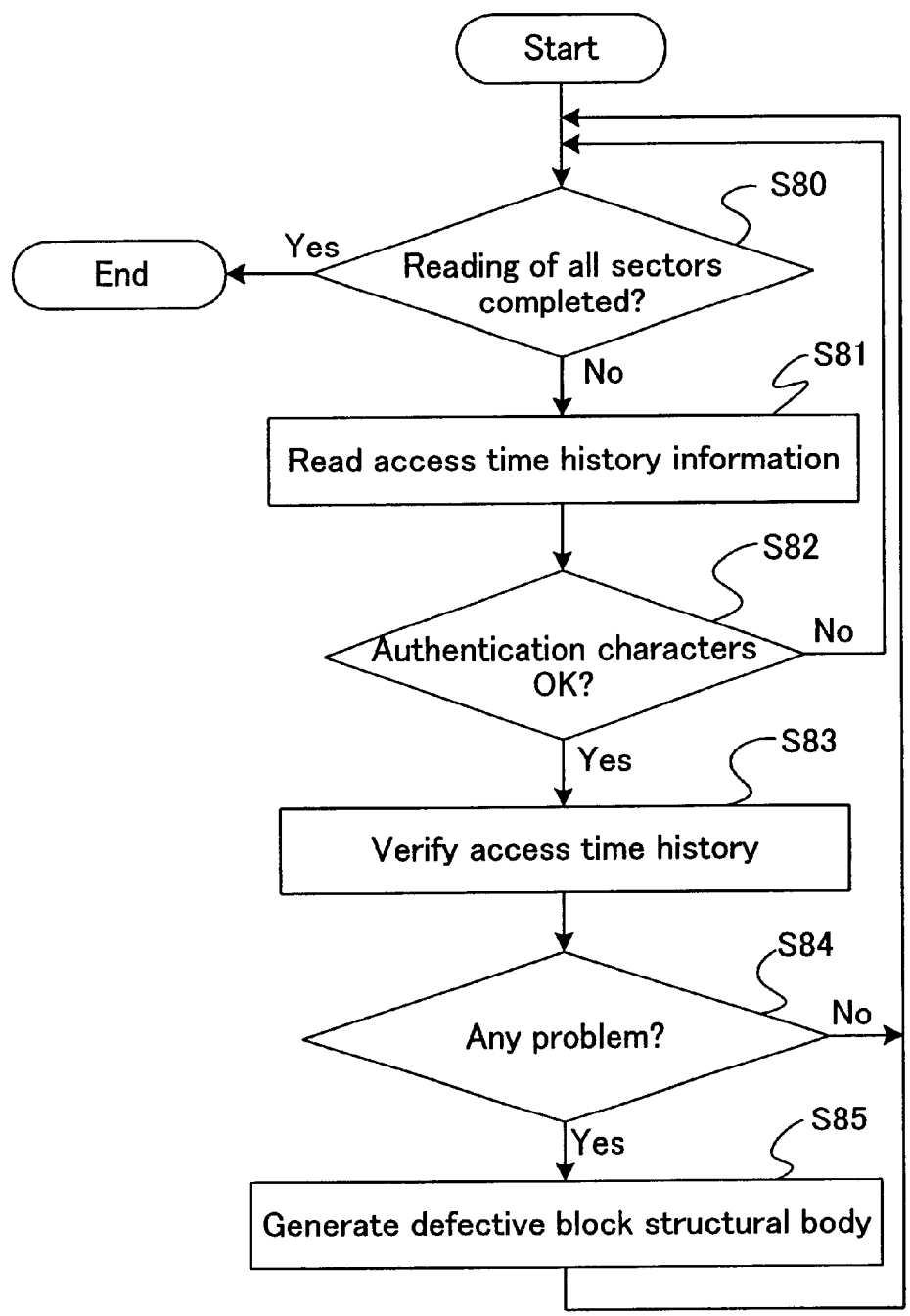
FIG. 24 is a flow chart showing the process of detecting defective regions.

Confirming that the access time history information authentication character string is stored, the defective region detection means 115 picks out a specific number, say, 5 of the latest sample times from those access time history information structural bodies and checks which is larger, the sample times or the maximum access time (set value) (FIG. 24, Steps S 82→S 83).

The maximum access time is determined on the basis of the block size and hard disk performance. If the block size is 120 KB and the hard disk is high in performance (for Audio Video), for example, it is desirable to set the maximum access time at 0.03 seconds or so.

In this connection, if all the sample times are smaller than the maximum access time, the defective region detection means 115 reads out the next access time history information storage sectors 203, 204 (FIG. 24, Steps S 84: No→S 80→S 81).

Figure 10:
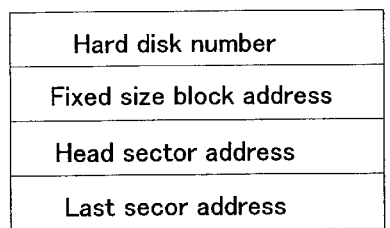
FIG. 10 is an arrangement example of defective region information items.

In case any of the sample times is larger than the maximum access time, the defective region detection means 115 determines that the block is a defective block and generates a defective block information structural body 261 (see FIG. 10), submitting this defective block structural body 261 to the file management means 112 and reading out the next access time history information storage sector (FIG. 24, Steps S 84: Yes→S 85→S 80→S 81). Receiving the defective block structural body 261, the file management means 112 registers the body 261 as file management information.

When the process is completed with all the access time history information storage sectors 203, 204 in the hard disks 4(1)–(4) (FIG. 24, Step S 80: Yes), the procedure for detection of defective regions comes to an end.

It is noted that either reading time history information or writing time history information may be used as the access time history information. The two may be used simultaneously.

(Recording Procedure)

In the recording procedure according to the present embodiment, it is so configured that a defective block detected as described above is avoided to record a stream data. The procedure is explained with reference to the flow chart shown in FIG. 25.

In the same way as in Embodiment 1, the writing means 18 acquires the head address of a vacant space on each hard disk 4(k). Indicating this head address, the writing means 18 inquires of the file management means 112 if a defective block is present. If a defective block is found after the head address, the file management means 112 which has received the inquiry return to the writing means 18 the defective block information (defective block structural body 261) (FIG. 25, Steps S 90→S 91).

Figure 25:
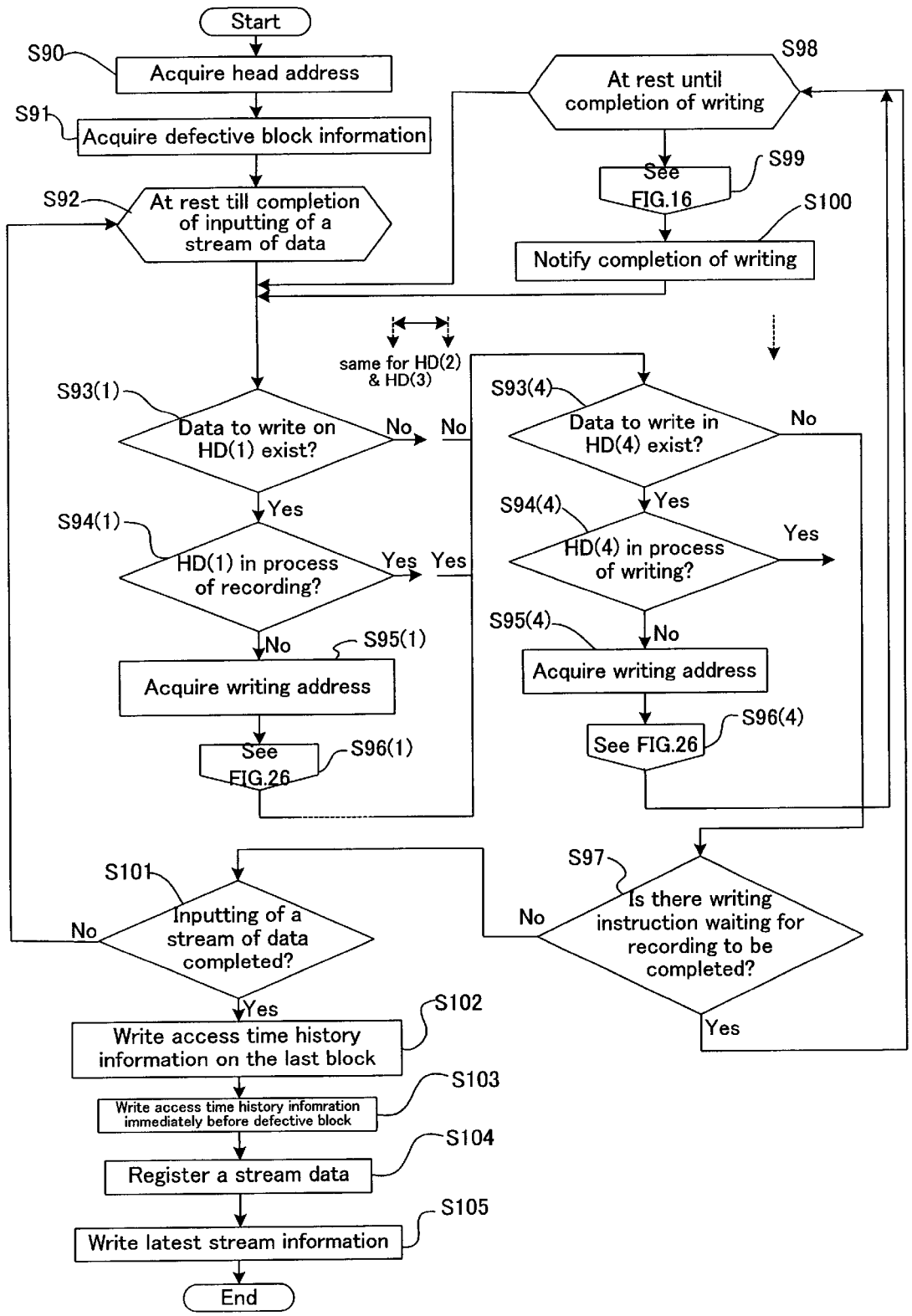
FIG. 25 is a flow chart showing the process of writing in the second embodiment.

The present embodiment is identical with Embodiment 1 in the process up to the step where the writing means 18 acquires the writing address from the recording buffer manager 16 (FIG. 25, Steps S 92→S 93→S 94→S 95). The process up to that step are eliminated from the specification due to redundancy but the procedure of issuing writing instructions (FIG. 25, Step S 96) is explained in detail.

First, the writing means 18 judges if the writing instruction is the first writing order. If the instruction is found to be the first (in case no access time history information writing is involved), the writing means 18 judges on the basis of all the defective block structural bodies 261 acquired as described above whether a defective block is present in a specific area of the hard disk 4(k) (FIG. 26, Steps S 96-1: Yes→S 96-8).

Figure 26:
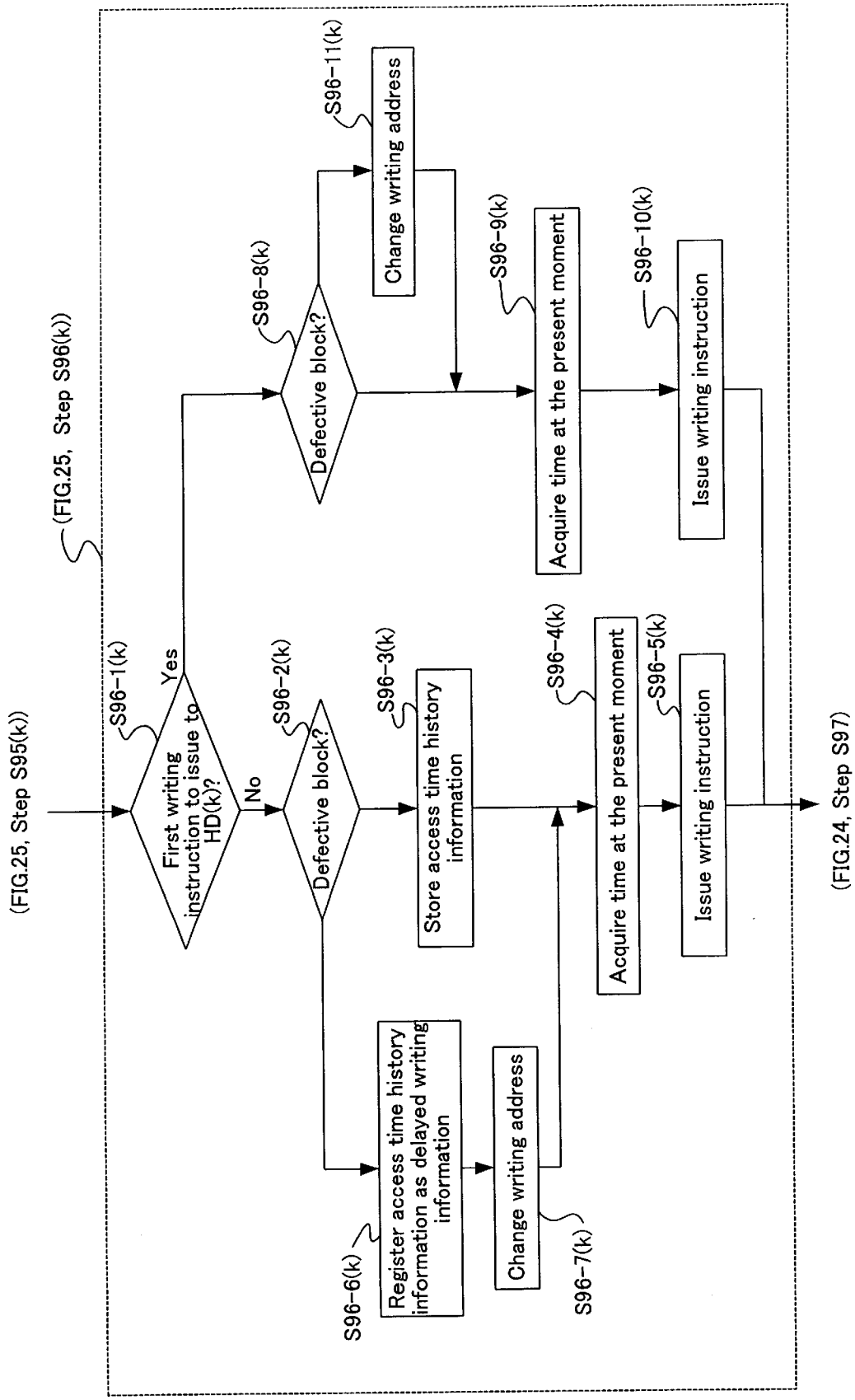
FIG. 26 is a flow chart showing the process of issuing writing instructions in the second embodiment.

If it is judged that no defective block is present, then the writing means 18 issues a writing instruction in the same way as in Embodiment 1 (FIG. 26, Steps S 96-8: Yes→S 96-9→S 96-10). If it is judged that a defective block is present, the writing means 18 issues a writing instruction by specifying the address obtained by adding the size for one memory block to the writing address on the hard disk (FIG. 26, Steps S 96-8: No→S 96-11→S 96-9→S 96-10).

If it is judged that the writing instruction is the second or later writing instruction (accompanied by writing of access time history information), the writing means 18 first judges if a defective block is present in a specific area of the hard disk 4(k) on the basis of all the defective block structural bodies 261 in the same way as in the aforesaid case where it is judged that no defective block is present (FIG. 26, Steps S 96-1: No→S96-2).

In case it is judged that no defective block is present, then the writing means 18 issues a writing instruction in the same way as in Embodiment 1 (FIG. 26, Steps S 96-2: No→S 96-3→S 96-4→S 96-5). In case it is judged that a defective block is present, the writing means 18 temporarily stores on the memory 5 the access time history information as delayed writing information to prevent deterioration of the recording performance (which will be described later). After that, the writing means 18 issues a writing instruction by adding the size for one memory block to the writing address on the hard disk (FIG. 26, Steps S 96-2: Yes→S 96-6→S 96-7→S 96-4→S 96-5).

Figure 28:
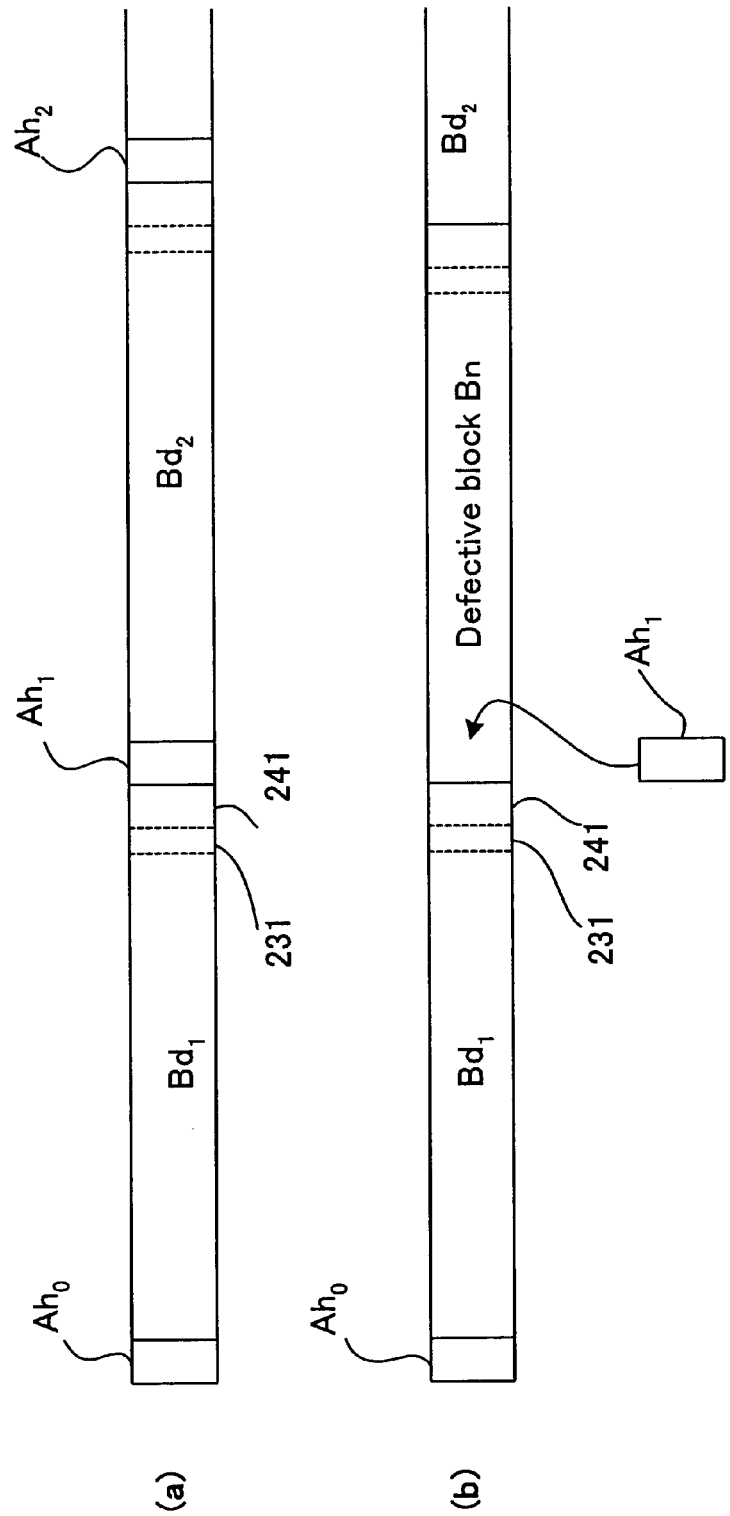
FIG. 28 is a diagrammatic illustration showing data being recorded in the second embodiment.
Figure 29:
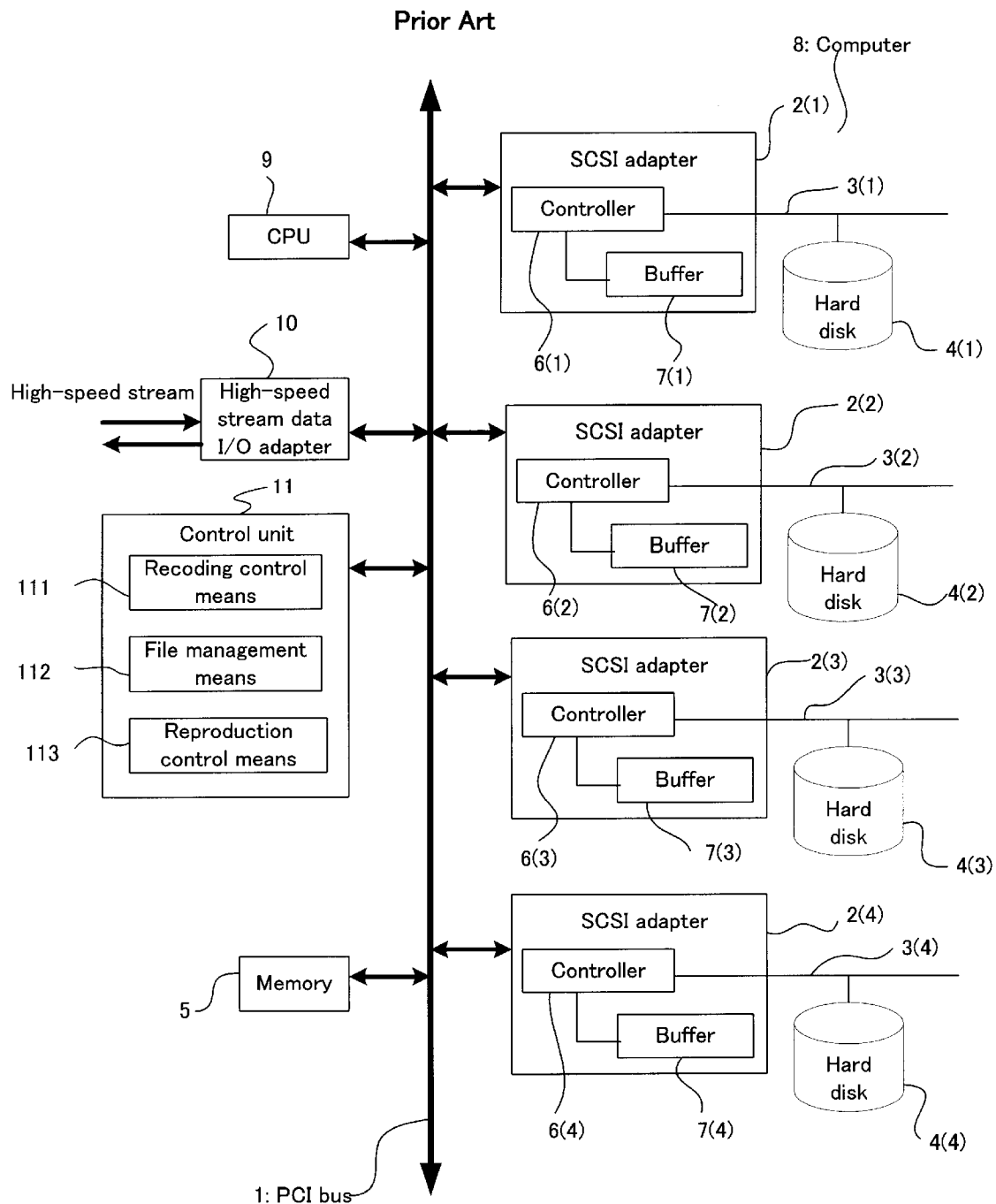
FIG. 29 is a schematic functional block diagram of the prior art data management apparatus.
Figure 30:
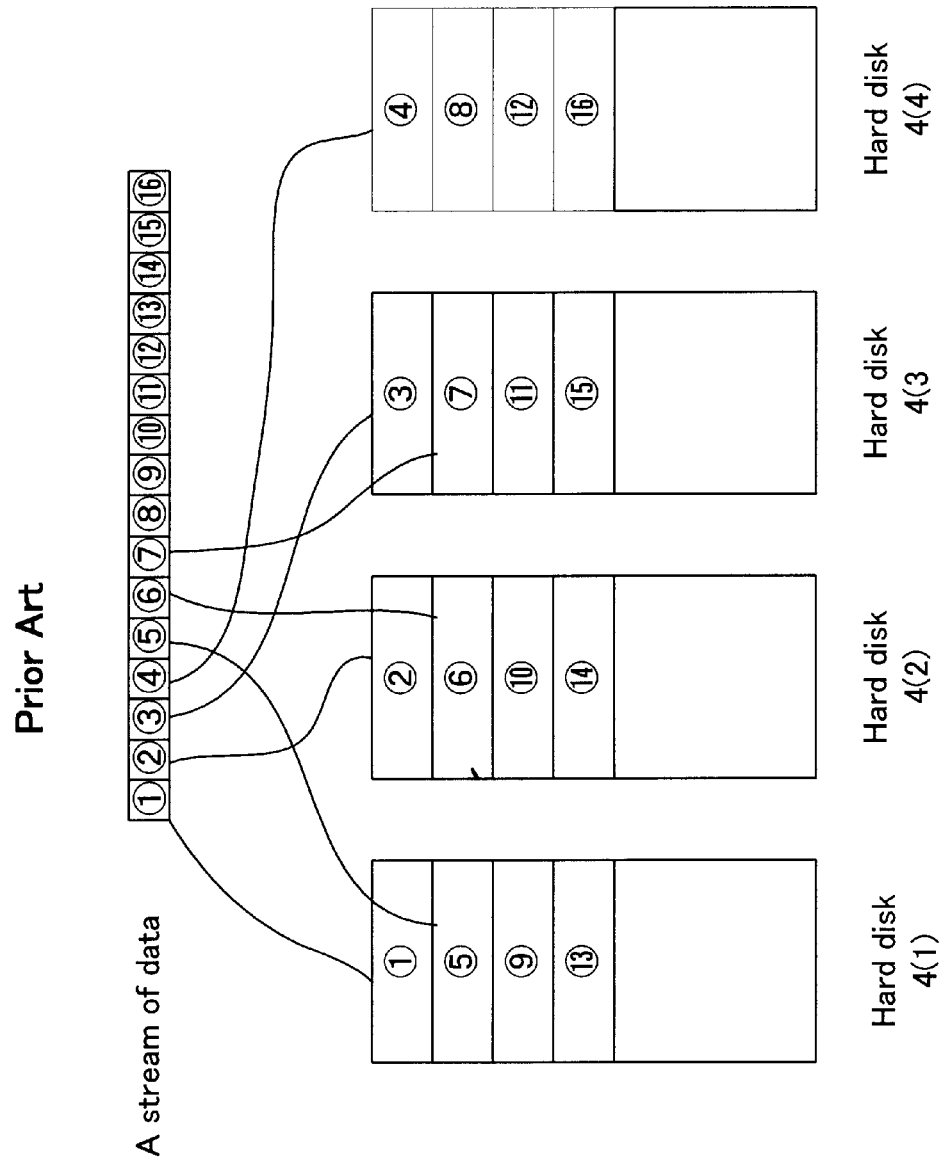
FIG. 30 is a conceptual diagram of recording data.

Properly speaking, continuity is ensured between the block data $Bd_1$ and its access time history information $Ah_1$, with the access time history information $Ah_1$ of the block data $Bd_1$ written incidentally at the head of the block data (including retrieval information structural body 231 and split management information structural body 24) $Bd_2$ as shown in FIG. 28(*a*). If, however, a writing instruction is issued by specifying a size-added address as mentioned above, continuity can not be maintained physically because a defective block Bn is present between the access time history information $Ah_1$ and the block data $Bd_1$.

To secure continuity, the access time history information $Ah_1$. of the block data $Bd_1$. would have to be first written at the rear of the block data $Bd_1$, and then the block data $Bd_2$ would have to be written at the rear of the defective block Bn. However, this procedure would increase the number of writing instructions and reduce the recording performance of data stream. According to the present invention, the access time history information $Ah_1$. is temporarily stored on the memory 5 as delayed writing information (FIG. 26, Step S 96-6) and that the delayed writing information thus temporarily stored is written at the rear of the corresponding block data $Bd_1$ after the inputting of data stream is completed as shown in FIG. 28(*b*) (FIG. 25, Step S 10). That way, the block data $Bd_2$ can be written with one writing instruction and does not reduce the recording performance.

The subsequent steps are identical with those in Embodiment 1 except for the step of writing the delayed writing information (FIG. 25, Step S 103). The description of those steps is eliminated.

As set forth above, the recording process in the present embodiment permits recording of a stream data avoiding a defective block by acquiring defective block information in advance.

(Reproduction Process)

Now, the process of reproducing a stream data recorded avoiding a defective block as described above will be explained with reference to the flow chart shown in FIG. 27.

The reading means 22, which has read out and acquired the head address in the same process as in Embodiment 1, indicates the read out address and inquires of the file management means 112 if a defective block is present. If a defective block is present behind the read out head address, the file management means 112, which has received the inquiry, returns the defective block information (defective block structural body) to the reading mean 22 (FIG. 27, Steps S 110→S 111).

Figure 27:
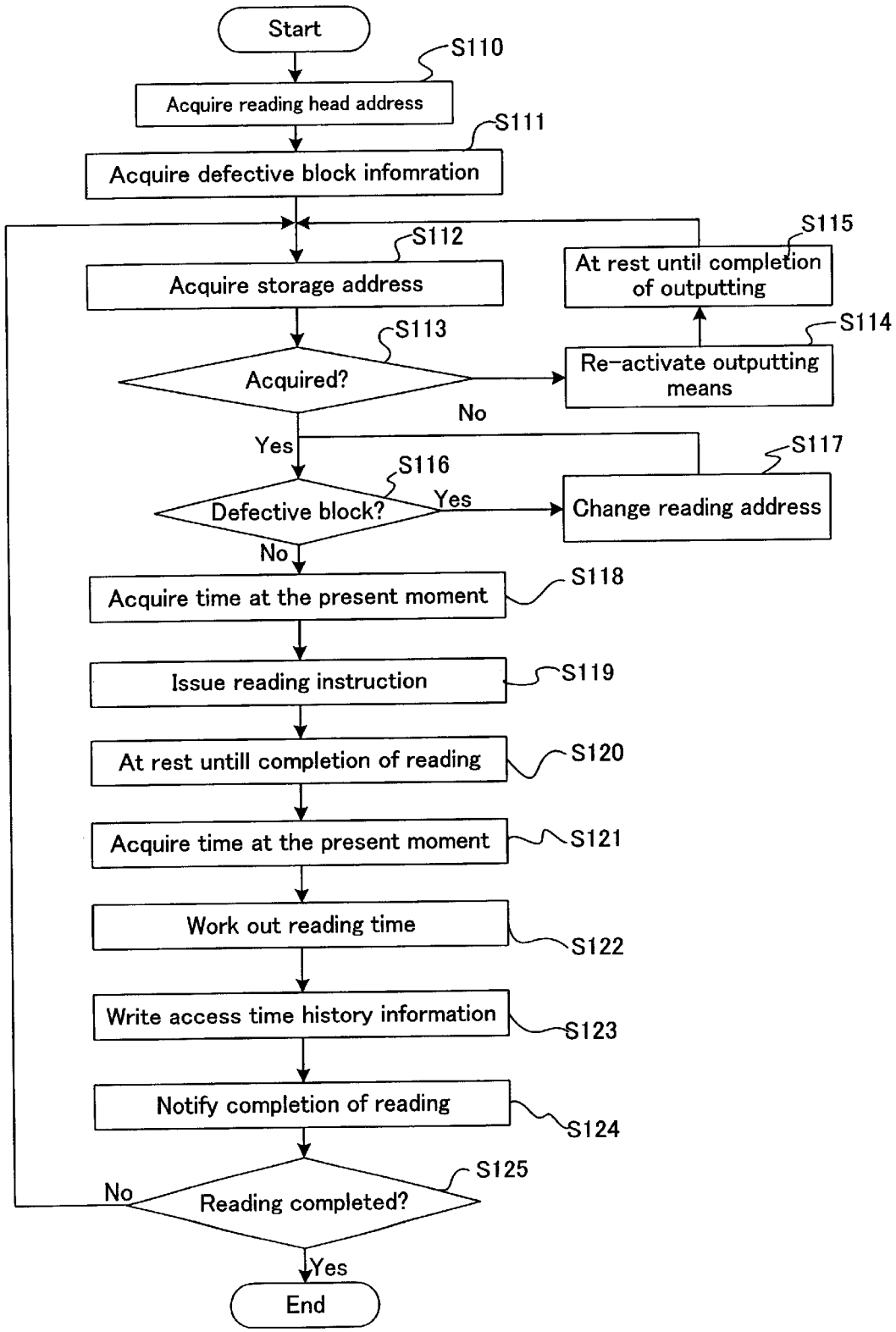
FIG. 27 is a flow chart showing the reading process in the second embodiment.

The process up to the step of the reading means 22 acquiring a storage address from the reproduction buffer manager 19 (FIG. 27, Step S 113: Yes) is the same as that in Embodiment 1, the explanation of which is eliminated to avoid redundancy. The subsequent steps are hereby explained.

First, the reading means 22 judges if a defective block is present in a specific area on the hard disk 4(k), an object to read out, on the basis of all the defective block structural bodies 261 (FIG. 27, Step S 116).

If it is judged that no defective block is present, then the reading means 22 issues a reading instruction in the same way as in Embodiment 1 (FIG. 27, Steps S 116: Yes→S 118→S 119). If it is judged that a defective block is present, then the reading means 22 issues a reading instruction, indicating an address obtained by adding the size for one memory block to the writing address acquired as described above (FIG. 27, Steps S 116: No→S 117→S 118→S 119).

The subsequent steps are identical with those in Embodiment 1 and are not described again.

As set forth above, the reproducing procedure in the present embodiment permits reproduction of a stream data recorded avoiding a defective block as mentioned above.

In the description of the embodiments, the access time history information (reading time history information-and writing time history information) is used as criteria for judging the access performance of hard disk. As its alternative, the number of defective sectors contained in one block, for example, may be used. In the descriptions, one access time (in the above case, 0.03 second) is used as reference. Instead, a plurality of references may be set and used properly according to the kinds of application—the application requiring high-speed access in particular, the application requiring some speedy access, the application which does not require so high speed access. In this arrangement, levels corresponding to the aforesaid plurality of references may be written in defective structural bodies in the step generating a defective block in FIG. 24 (Step S 85) so that blocks below a specific level according to the access speed required by the application used may be taken as defective in the step of acquiring defective block information shown in FIG. 25 (Step S 91).

It is also noted that the file management means 112 stores and manages file management information on a second recording medium. The second recording medium is a hard disk. But that is not restrictive. A recording medium which is non-volatile and small in capacity like flash memory may be used.

According to Recovery Procedure 1, retrieval information is added and recorded in an excessive space in the last of the sectors where a block is recorded, and therefore there is no need to reserve an area for recording retrieval information on the hard disk. It is also possible to recover desired file management information only by specifying recovery conditions. In this case, the file management information on the stream data stored last can be recovered.

In Recovery Procedure 2, split management information is added and recorded in parallel with recording of a stream data, and the user does not have to take the trouble to take backup procedure. Since only the sector where split management information is stored has to be read out and the reading is put to an end when the required information is confirmed, the second recovery procedure is faster than Recovery Procedure 1 in recovering file management information.

According to the second embodiment, access time history information such as history information on the time needed for writing a block, history information on the time required for reading out or the number of defective blocks within the block are added to and recorded on that block. That permits confirmation of writing performance and reading performance at a specific address on the hard disk for every block. That is, defective regions on the hard disk can be detected. Furthermore, it is so configured that a stream data is recorded by avoiding the defective region thus detected. That makes the recording speed lower than the data inputting speed, preventing overflow errors from occurring. In addition, it is so arranged that record of access time history information on the block immediately before the defective block is temporarily stored as delayed recording information and recorded after the recording of a series of stream data is completed. Therefore, a stream data can be recorded without affecting the recording performance.

If certain defective levels in blocks are set in advance on the basis of the aforesaid access history information, defective levels can be used properly according to the kind of application required.

As set forth above, the data management apparatus of the present invention is provided with a recovery function and a defective region detection function with this configuration adopted: file management is effected independently and not via a file system provided in the operating system so as to realize high-speed and seamless recording and reproduction of data.

What is claimed is:

1. A data management apparatus for managing a stream of data, comprising:

recording control means for dividing the stream of data into blocks of a fixed size, generating retrieval information for each of the data blocks, in which the retrieval information specifies the corresponding data block, and recording the data blocks and the retrieval information on a first recording medium;

file management means for managing the stream of data recorded on the first recording medium, on the basis of file management information specifying the stream of data; and recovery means for recovering the file management information on the basis of the retrieval information when recovery of the file management information is requested, wherein the first recording medium is a storage medium comprising sectors, each of the sectors for storing a fixed amount of data; and the recording control means is configured to record each data block in the first recording medium by using one or more sectors, and for said each data block, record the corresponding retrieval information in a remaining region of the last sector where the data block is recorded.

2. The data management apparatus as defined in claim 1, wherein the file management information is recorded on a second recording medium other than the first recording medium.

3. A data management apparatus for managing a stream of data, comprising:

recording control means for dividing the stream of data into blocks of a fixed size, generating retrieval information for each of the data blocks, in which the retrieval information specifies the corresponding data block, and recording the data blocks and the retrieval information on a first recording medium;

file management means for managing the stream of data recorded on the first recording medium, on the basis of file management information specifying the stream of data; and recovery means for recovering the file management information on the basis of the retrieval information when recovery of the file management information is requested, wherein the retrieval information includes information on at least one of a serial number, date and author.

4. The data management apparatus as defined in claim 3, wherein the first recording medium is a storage medium comprising sectors, each of the sectors for storing a fixed amount of data; and the recording control means is configured to record each data block in the first recording medium by using one or more sectors, and for said each data block, record the corresponding retrieval information in a remaining region of the last sector where the data block is recorded.

5. The data management apparatus as defined in claim 3, wherein the first recording medium is a storage medium comprising sectors, each of the sectors for storing a fixed amount of data; and the recording control means records the retrieval information on the sector following one or more sectors where the corresponding data block is recorded.

6. The data management apparatus as defined in claim 3, wherein the file management information is recorded on a second recording medium other than the first recording medium.

7. A data management method for managing a stream of data, comprising the steps of:

dividing the stream of data into data blocks of a fixed size;

generating retrieval information for each of the data blocks, the retrieval information specifying the corresponding data block, recording the data blocks and the retrieval information on a first recording medium;

storing file management information for managing the stream of data recorded on the first recording medium, the file management information specifying the stream of data; and recovering the file management information on the basis of the retrieval information when recovery of the file management information is requested, wherein the first recording medium is a storage medium comprising sectors, each of the sectors for storing a fixed amount of data; and each data block is recorded in the first recording medium by using one or more sectors, and for said each data block, the corresponding retrieval information is recorded in a remaining region of the last sector where the data block is recorded.

8. The data management method as defined in claim 7, wherein the file management information is recorded on a second recording medium other than the first recording medium.

9. A data management method for managing a stream of data, comprising the steps of:

dividing the stream of data into data blocks of a fixed size;

generating retrieval information for each of the data blocks, the retrieval information specifying the corresponding data block, recording the data blocks and the retrieval information on a first recording medium;

storing file management information for managing the stream of data recorded on the first recording medium, the file management information specifying the stream of data; and recovering the file management information on the basis of the retrieval information when recovery of the file management information is requested, wherein the retrieval information includes information on at least one of a serial number, date and author.

10. The data management method as defined in claim 9, wherein the first recording medium is a storage medium comprising sectors, each of the sectors for storing a fixed amount of data; and each data block is recorded in the first recording medium by using one or more sectors, and for said each data block, the corresponding retrieval information is recorded in a remaining region of the last sector where the data block is recorded.

11. The data management method as defined in claim 9, wherein the first recording medium is a storage medium comprising sectors, each of the sectors for storing a fixed amount of data; and said retrieval information is recorded on the sector following one or more sectors where the corresponding data block is recorded.

12. The data management method as defined in claim 9, wherein the file management information is recorded on a second recording medium other than the first recording medium.

13. A program recording medium, including instructions to perform the steps of:

dividing a stream of data into data blocks of a fixed size;

generating retrieval information for each of the data blocks, the retrieval information specifying the corresponding data block, recording the data blocks and the retrieval information on a first recording medium;

storing file management information for managing the stream of data recorded on the first recording medium, the file management information specifying the stream of data; and recovering the file management information on the basis of the retrieval information when recovery of the file management information is requested, wherein the first recording medium is a storage medium comprising sectors, each of the sectors for storing a fixed amount of data; and each data block is recorded in the first recording medium by using one or more sectors, and for said each data block, the corresponding retrieval information is recorded in a remaining region of the last sector where the data block is recorded.

14. The program recording medium as defined in claim 13, wherein the file management information is recorded on a second recording medium other than the first recording medium.

15. A program recording medium, including instructions to perform the steps of:

dividing a stream of data into data blocks of a fixed size;

generating retrieval information for each of the data blocks, the retrieval information specifying the corresponding data block, recording the data blocks and the retrieval information on a first recording medium;

storing file management information for managing the stream of data recorded on the first recording medium, the file management information specifying the stream of data; and recovering the file management information on the basis of the retrieval information when recovery of the file management information is requested, wherein the retrieval information includes information on at least one of a serial number, date and author.

16. The program recording medium as defined in claim 15, wherein the first recording medium is a storage medium comprising sectors, each of the sectors for storing a fixed amount of data; and each data block is recorded in the first recording medium by using one or more sectors, and for said each data block, the corresponding retrieval information is recorded in a remaining region of the last sector where the data block is recorded.

17. The program recording medium as defined in claim 15, wherein the first recording medium is a storage medium comprising sectors, each of the sectors for storing a fixed amount of data; and said retrieval information is recorded on the sector following one or more sectors where the corresponding data block is recorded.

18. The program recording medium as defined in claim 15, wherein the file management information is recorded on a second recording medium other than the first recording medium.

* * * * *

UNITED STATES PATENT AND TRADEMARK OFFICE
CERTIFICATE OF CORRECTION

PATENT NO.    : 6,754,680 B1  
DATED         : June 22, 2004  
INVENTOR(S)   : Naohisa Motomura et al.

It is certified that error appears in the above-identified patent and that said Letters Patent is hereby corrected as shown below:

Title page, Item [54] and Column 1, line 1,
Change the title from "DATA CONTROL EQUIPMENT, METHOD TO CONTROL DATA AND RECORDING MEDIUM TO RECORD DATA CONTROL PROCEDURE" to -- APPARATUS AND METHOD FOR FAST DATA ACCESS AND RECOVERY USING IMPROVED FILE MANAGEMENT TECHNIQUES --.

Signed and Sealed this

Tenth Day of May, 2005

JON W. DUDAS  
*Director of the United States Patent and Trademark Office*